United States Patent
Tanaka et al.

(10) Patent No.: US 7,395,408 B2
(45) Date of Patent: Jul. 1, 2008

(54) PARALLEL EXECUTION PROCESSOR AND INSTRUCTION ASSIGNING MAKING USE OF GROUP NUMBER IN PROCESSING ELEMENTS

(75) Inventors: Takeshi Tanaka, Moriguchi (JP); Satoshi Takashima, Kita-ku (JP); Hideshi Nishida, Nishinomiya (JP); Kozo Kimura, Toyonaka (JP); Tokuzo Kiyohara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 395 days.

(21) Appl. No.: 10/686,746

(22) Filed: Oct. 16, 2003

(65) Prior Publication Data
US 2004/0133765 A1    Jul. 8, 2004

(30) Foreign Application Priority Data
Oct. 16, 2002 (JP) .............................. 2002-302281
Nov. 7, 2002 (JP) .............................. 2002-323938

(51) Int. Cl.
*G06F 15/80* (2006.01)
(52) U.S. Cl. ..................... 712/24; 712/203; 712/215; 712/216
(58) Field of Classification Search ................. 712/203, 712/215, 216, 20, 15, 224, 24

See application file for complete search history.

(56) References Cited

U.S. PATENT DOCUMENTS

| | | | | | |
|---|---|---|---|---|---|
| 4,825,360 | A | * | 4/1989 | Knight, Jr. ................... | 718/106 |
| 5,297,281 | A | * | 3/1994 | Emma et al. ................. | 712/216 |
| 5,347,639 | A | * | 9/1994 | Rechtschaffen et al. ..... | 712/203 |
| 5,355,460 | A | * | 10/1994 | Eickemeyer et al. ........ | 712/215 |
| 5,475,856 | A | * | 12/1995 | Kogge .......................... | 712/20 |
| 5,968,167 | A | * | 10/1999 | Whittaker et al. ........... | 712/225 |
| 6,167,502 | A | * | 12/2000 | Pechanek et al. .............. | 712/15 |
| 6,173,389 | B1 | * | 1/2001 | Pechanek et al. .............. | 712/24 |

OTHER PUBLICATIONS

Rymarczyk, James W, Coding Guidelines for Piplined Processors, Mar. 13, 1982, Architectural Support for Programming Languages and Operating Systems, 12-19.*

* cited by examiner

*Primary Examiner*—Tonia L M Dollinger

(57) ABSTRACT

The parallel execution processor 100 fetches a piece of instruction data. When the piece of instruction data includes only one instruction, the instruction decoding unit 120 assigns the one instruction to all the PEs. When the piece of instruction data includes two instructions, the instruction decoding unit 120 forms all the PEs into two groups, so as to assign one instruction to each group. By making it possible to execute, in parallel, not only one type of instruction but also instructions that are different from each other, it is possible to improve the utilization efficiency of the parallel execution processor 100.

16 Claims, 23 Drawing Sheets

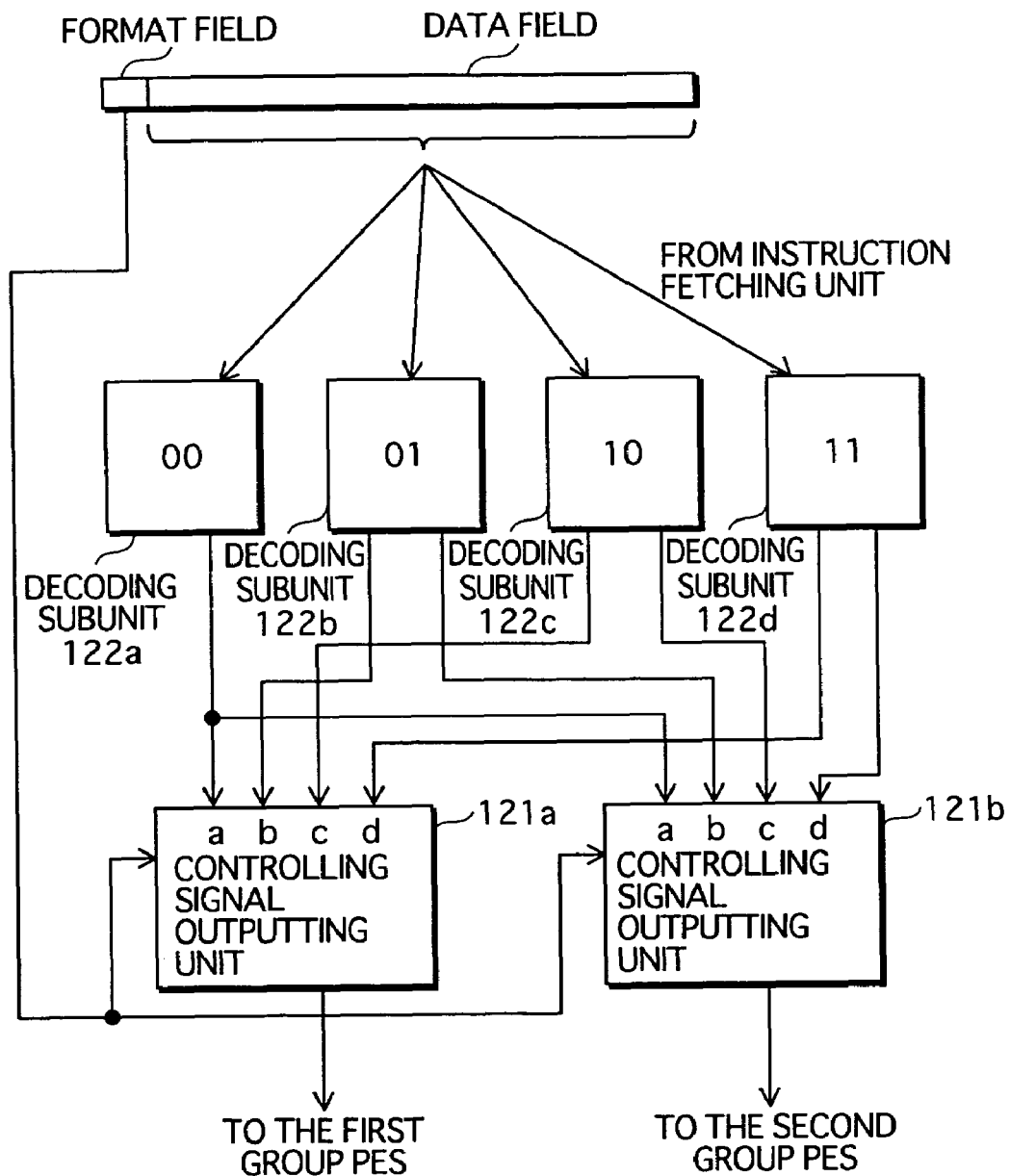

FIG.7

|  | COMBINATION A | | | | COMBINATION B | | | |
|---|---|---|---|---|---|---|---|---|
| GROUPING INFORMATION | "0b00" | | | | "0b01" | | | |
| INPUTTED FROM | 251a | | 251b | | 251a | | 251b | |
| OUTPUTTED TO | 255a | 255c | 255b | 255d | 255a | 255b | 255c | 255d |

FIG.11A

| 0 | 1 | 0 | 1 |
|---|---|---|---|
| 1 | 2 | 3 | 4 |

FIG.11B

| 0 | 0 | 1 | 1 |
|---|---|---|---|
| 1 | 2 | 3 | 4 |

FIG.20A

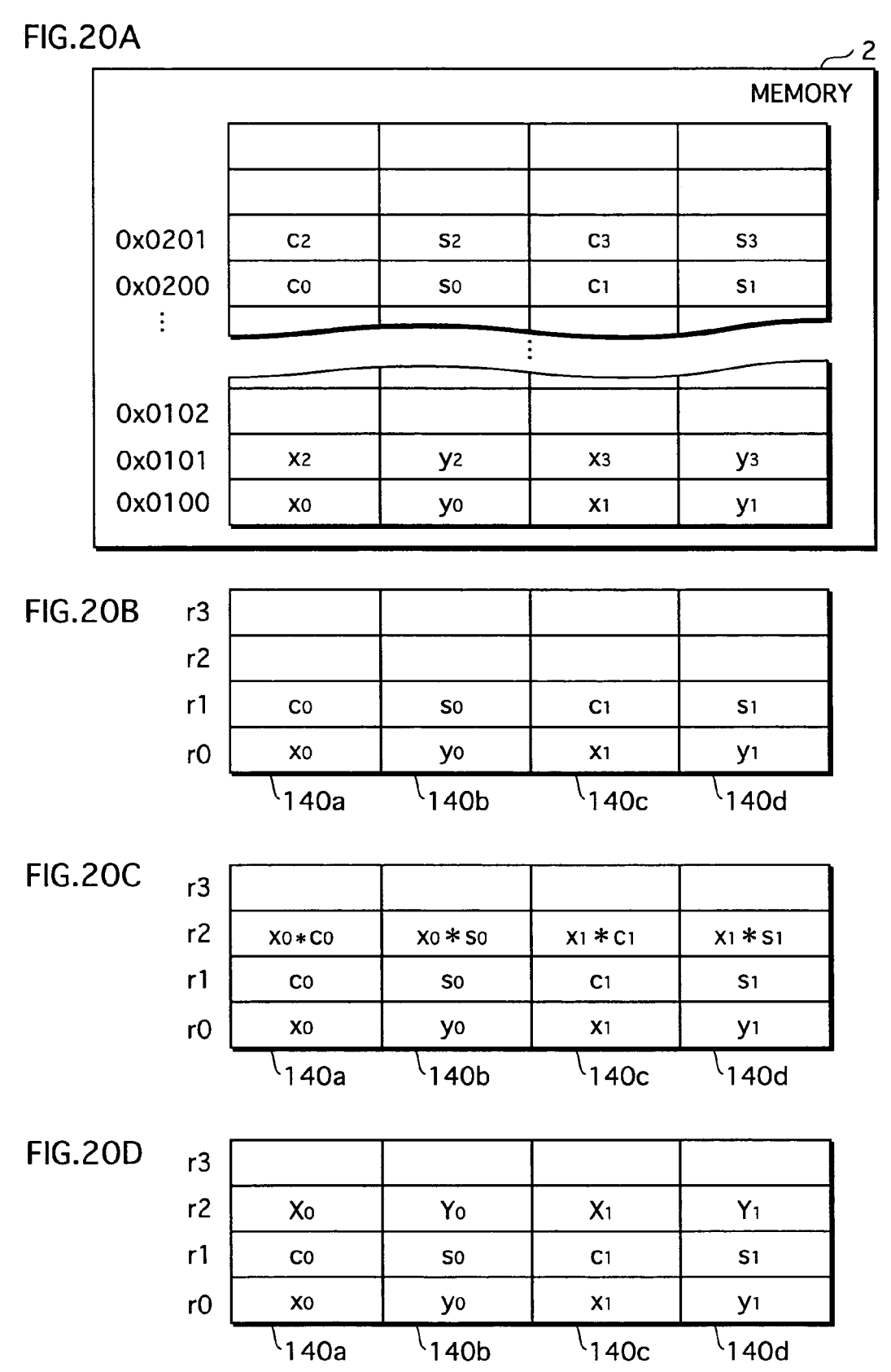

| | | | | | MEMORY |
|---|---|---|---|---|---|
| | | | | | |
| | | | | | |
| 0x0201 | | C2 | S2 | C3 | S3 |
| 0x0200 | | C0 | S0 | C1 | S1 |
| ⋮ | | | ⋮ | | |
| 0x0102 | | | | | |
| 0x0101 | | x2 | y2 | x3 | y3 |
| 0x0100 | | x0 | y0 | x1 | y1 |

FIG.20B

| | | | | |
|---|---|---|---|---|
| r3 | | | | |
| r2 | | | | |
| r1 | C0 | S0 | C1 | S1 |
| r0 | x0 | y0 | x1 | y1 |
| | 140a | 140b | 140c | 140d |

FIG.20C

| | | | | |
|---|---|---|---|---|
| r3 | | | | |
| r2 | X0∗C0 | X0∗S0 | X1∗C1 | X1∗S1 |
| r1 | C0 | S0 | C1 | S1 |
| r0 | x0 | y0 | x1 | y1 |
| | 140a | 140b | 140c | 140d |

FIG.20D

| | | | | |
|---|---|---|---|---|
| r3 | | | | |
| r2 | X0 | Y0 | X1 | Y1 |
| r1 | C0 | S0 | C1 | S1 |
| r0 | x0 | y0 | x1 | y1 |
| | 140a | 140b | 140c | 140d |

MULTIPLICATION

MULTIPLY-SUBTRACT AND MULTIPLY-ACCUMULATE

PARALLEL EXECUTION PROCESSOR AND INSTRUCTION ASSIGNING MAKING USE OF GROUP NUMBER IN PROCESSING ELEMENTS

BACKGROUND OF THE INVENTION

1. Field of the Invention

The present invention relates to parallel execution processors, particularly to techniques for improving utilization efficiency of parallel execution processors.

2. Description of the Related Art

In multimedia data processing in which images and sounds are handled, it is necessary to apply one operation to a huge amount of data, for example, putting a filter on a whole image to change the color tone or the image quality. In order to reduce the time required for such a type of operation, an SIMD (Single Instruction Multiple Data) processor has been conventionally used.

An SIMD processor comprises a plurality of processing elements and has the processing elements respectively execute one instruction in parallel. Normally, an SIMD processor is included in a computer as a coprocessor of a CPU (Central Processing Unit). When there is an operative instruction by the CPU, the SIMD processor fetches one operation instruction and a plurality of pieces of data from a memory, and has the processing elements respectively execute the operation instruction in parallel. For example, when an SIMD processor includes 128 processing elements, one operation instruction is executed in 128-way parallel. This way, it is possible to reduce the time required in multimedia data processing.

Although an SIMD processor is effective when one operation is applied to a huge amount of data, it is not suitable for other types of processing. Because of this reason, a CPU uses an SIMD processor only for multimedia data processing and suspends the operation of the SIMD processor while other types of processing are performed. This results in inefficient utilization of hardware resources as a whole computer.

In addition, an SIMD processor fetches a plurality of pieces of data from the memory all at once; therefore, even during multimedia data processing, when a memory stores therein pieces of data that require different types of operation, the CPU needs to change the order in which the pieces of data are arranged before having the SIMD processor perform those different types of operation. The larger the amount of data is, the longer it takes to change the order of the pieces of data, and it could be an obstacle in reduction of the time required for multimedia data processing.

SUMMARY OF THE INVENTION

A first object of the present invention is to provide a technique for improving utilization efficiency of hardware resources as a whole computer.

Further, a second object of the present invention is to provide a technique for reducing the time required for multimedia data processing, even when a memory stores therein pieces of data that require different types of operation.

The present invention provides a parallel execution processor comprising: a plurality of processing elements; an obtaining unit operable to obtain (i) a piece of group number information indicating how many groups the processing elements should be formed into and (ii) an instruction sequence including one or more instructions; a decoding unit operable to decode the obtained instruction sequence; a group forming unit operable to form the processing elements into as many groups as indicated by the piece of group number information; and an execution controlling unit operable to assign part or all of the instructions included in the decoded instruction sequence to the groups, so that one group receives one instruction, and control the processing elements so that (i) the instructions received by the groups are executed in parallel, and (ii) in each group, all processing elements in the group are employed in parallel for the execution of the received instruction.

With this arrangement, the parallel execution processor is able to form the processing elements into one or more groups and assign the instructions to the groups in such a manner that one group receives one instruction so that the instructions are executed in parallel.

Consequently, the parallel execution processor is able to, not only have all the processing elements respectively execute one instruction in parallel, but also form the processing elements into groups so that different groups execute different instructions in parallel.

This way, since it is possible to execute, in parallel, a plurality of different instructions, as well as one instruction, it is possible to apply the parallel execution processor to a wider range of processing and to improve utilization efficiency.

The parallel execution processor may have an arrangement wherein the instruction sequence includes as many instructions as the number of groups indicated by the piece of group number information.

With this arrangement, the parallel execution processor is able to assign each of the decoded instructions to a different one of the groups in a one-to-one correspondence.

The parallel execution processor may have an arrangement wherein the number of groups indicated by the piece of group number information is either one or two, when the number of groups indicated is one, the group forming unit forms all of the processing elements into one group, and when the number of groups indicated is two, the group forming unit forms all of the processing elements into two groups so that the two groups contain an equal number of processing elements.

With this arrangement, the parallel execution processor is able to select one out of (a) forming all the processing elements into one group and (b) forming all the processing elements into two groups each containing half as many processing elements as exist.

This way, the parallel execution processor is able to, not only have all the processing elements respectively execute one instruction in parallel, but also form the processing elements into two groups so that these two groups execute two different instructions in parallel. For example, when there are 128 processing elements, the parallel execution processor is able to select either (a) have one instruction executed in 128-way parallel or (b) have two instructions executed in 64-way parallel respectively. In such a case, even when two groups are formed, each group has as many as 64 processing elements. Consequently, in each group, it is possible to reduce the time required for data processing without losing the advantageous features of an SIMD processor.

The parallel execution processor may further comprise a register that includes a plurality of register files each of which corresponds to a different one of the processing elements, wherein the instruction sequence includes a first instruction and a second instruction, the register files are arranged in the register so that first-group register files and second-group register files alternate, (i) the first-group register files each storing therein a piece of data to be processed when the first instruction is executed and (ii) the second-group register files each storing therein a piece of data to be processed when the second instruction is executed, when the number of groups indicated is two, the group forming unit forms the processing elements corresponding to the first-group register files into one of the two groups, and the processing elements corresponding to the second-group register files into the other group, and each of the processing elements obtains the piece of data to be processed from the corresponding register file.

With this arrangement, the parallel execution processor forms the processing elements into two groups according to the order in which the pieces of data are arranged in the register file.

Consequently, even when the memory stores therein both (i) pieces of data to be processed when the first instruction is executed and (ii) pieces of data to be processed when the second instruction is executed, which are arranged so that alternate, the parallel execution processor is able to load those pieces of data to register all at once without having to change the order in which the pieces of data are arranged and have the instructions for the pieces of data executed in parallel.

The parallel execution processor may have an arrangement wherein the register files are formed into a plurality of pairs, keeping an order in which the register files are arranged in the register, each of the instructions includes a piece of selection information indicating which piece of data, each processing element should obtain, selecting out of (a) the piece of data stored in the corresponding register file and (b) the piece of data stored in a register file with which the corresponding register file is paired, and each of the processing elements obtains the piece of data to be processed from the register file indicated in each piece of selection information.

With this arrangement, the parallel execution processor is able to allow each processing element to choose one of the register files from which the processing element obtains apiece of data to be processed.

Consequently, the parallel execution processor is able to increase the number of types of register files that can be designated by one instruction, and thereby, to increase the number of types of instructions that can be executed in parallel.

The parallel execution processor may have an arrangement wherein when the number of groups indicated is two, the execution controlling unit includes: a storing unit that stores therein a plurality of combination options based on which of the processing elements should belong to each of the two groups, the combination options being prepared for each of a plurality of grouping procedures; a grouping information obtaining unit operable to obtain a piece of grouping information indicating which one of the grouping procedures should be used; and a selecting unit operable to select one of the combination options according to the obtained piece of grouping information.

With this arrangement, when the processing elements are formed into two groups, the parallel execution processor is able to dynamically change the procedure used for grouping the processing elements. For this arrangement, a plurality of grouping procedures are stored in the parallel execution processor, and one of them will be selected.

This way, since it is possible to dynamically change the grouping procedure, instead of using one fixed grouping procedure, it is possible to apply the parallel execution processor to a wider range of processing and to further improve utilization efficiency.

The parallel execution processor may have an arrangement wherein when the number of groups indicated is two, the execution controlling unit includes: a grouping information obtaining unit operable to obtain a piece of grouping information indicating to which of the two groups, each of the processing elements should belong; and a grouping unit operable to form the processing elements into the two groups according to the obtained piece of grouping information.

With this arrangement, when the processing elements are formed into two groups, it is possible to dynamically change to which group each processing element belongs.

This way, since it is possible to change to which group each processing element belongs, it is possible to apply the parallel execution processor to a wider range of processing and to further improve utilization efficiency.

It is also acceptable that the parallel execution processor further comprises a fetching unit operable to fetch a piece of data which is of a predetermined length and has a format field and a data field, wherein each of the instructions includes an OP code and an operand, a positioning pattern is written in the format field, the positioning pattern being for positioning OP codes and operands in the data field, in the piece of data, one or more OP codes and one or more operands are arranged in the data field in an order defined by the positioning pattern written in the format field, the number of groups indicated by the piece of group number information is a number of instructions defined by the positioning pattern, the decoding unit extracts, from the piece of data, the one or more OP codes and the one or more operands, according to the positioning pattern so as to decode the OP codes and the operands of the instructions, and the execution controlling unit assigns, in the defined order, the decoded instructions to the groups.

With this arrangement, the piece of data being of a predetermined length (i) includes one or more instructions and (ii) defines the number of groups the processing elements should be formed into and the procedure for assigning the instructions to the groups. The parallel execution processor is able to have the instructions executed in parallel by the processing elements in the group, according to the piece of data.

Consequently, since the parallel execution processor obtains the group number information and the instruction sequence at the same time, even when the group formation changes frequently, the data processing will not be delayed.

It is also acceptable that the parallel execution processor further comprises a fetching unit operable to fetch a piece of data which is of a predetermined length; and a storing unit operable to store therein a predetermined positioning pattern for OP codes and operands, wherein each of the instructions includes an OP code and an operand, one or more OP codes and one or more operands are arranged in the piece of data in an order defined by the predetermined positioning pattern, the number of groups indicated by the piece of group number information is a number of instructions defined by the positioning pattern, the decoding unit extracts, from the piece of data, the one or more OP codes and the one or more operands, according to the positioning pattern so as to decode the OP codes and the operands of the instructions, and the execution controlling unit assigns, in the defined order, the decoded instructions to the groups.

With this arrangement, the piece of data being of a predetermined length (i) includes one or more instructions and (ii) defines the procedure for assigning the instructions to the groups. The positioning pattern, which is necessary for the decoding of the piece of data, is stored in the storing unit. The parallel execution processor is able to have the piece of data decoded according to the positioning pattern and have the instructions executed in parallel by the processing elements in the group.

Consequently, since the parallel execution processor stores therein the positioning pattern, the piece of data does not need to have a field in which the positioning pattern is written; therefore, it is possible to allocate a larger number of bits to OP codes and operands.

It is also acceptable that the parallel execution processor has an arrangement wherein when the number of groups indicated by the piece of group number information is two or larger, the obtaining unit obtains an instruction that instructs that processing elements included in some of the groups should halt operation, and the execution controlling unit controls the processing elements included in those groups so that those processing elements halt operation.

With this arrangement, the parallel execution processor is able to have some of the processing elements halt operation.

Consequently, the parallel execution processor is able to halt the operation of unnecessary processing elements so as to reduce electricity consumption.

The present invention also provides a parallel execution processor comprising: a plurality of processing elements; a register that includes a plurality of register files each of which corresponds to a different one of the processing elements, the register files being arranged in the register so that first-group register files and second-group register files are positioned according to a predetermined rule, (i) the first-group register files each storing there in a piece of data to be processed when a first instruction is executed and (ii) the second-group register files each storing therein a piece of data to be processed when a second instruction is executed; an obtaining unit operable to obtain an instruction sequence that includes the first instruction and the second instruction; a decoding unit operable to decode the first instruction and the second instruction included in the obtained instruction sequence; and an execution controlling unit operable to assign (i) the first instruction to the processing elements corresponding to the first-group register files and (ii) the second instruction to the processing elements corresponding to the second-group register files and control the processing elements so that (i) the first and second instructions are executed in parallel, (ii) the processing elements executing the first instruction are employed in parallel for the execution, and (iii) the processing elements executing the second instruction are employed in parallel for the execution.

With this arrangement, the parallel execution processor has the first instruction and the second instruction executed in parallel by the processing elements, according to the order in which (i) the piece of data to be processed when the first instruction is executed and (ii) the piece of data to be processed when the second instruction is executed are arranged in the register file.

Consequently, even when the memory stores therein both (i) the piece of data to be processed when the first instruction is executed and (ii) the piece of data to be processed when the second instruction is executed, which are arranged according to a predetermined rule, the parallel execution processor is able to load these pieces of data together without having to change the order in which they are arranged so that the instructions for different pieces of data can be executed in parallel.

The parallel execution processor may have an arrangement wherein the register files are arranged in the register so that the first-group register files and the second-group register files alternate.

With this arrangement, even when the memory stores therein both (i) the piece of data to be processed when the first instruction is executed and (ii) the piece of data to be processed when the second instruction is executed, which are arranged so that they alternate, the parallel execution processor is able to load these pieces of data together without having to change the order in which they are arranged so that the instructions for different pieces of data can be executed in parallel.

The parallel execution processor may have an arrangement wherein the register files are formed into a plurality of pairs, keeping an order in which the register files are arranged in the register, each of the instructions includes a piece of selection information indicating which piece of data, each processing element should obtain, selecting out of (a) the piece of data stored in the corresponding register file and (b) the piece of data stored in a register file with which the corresponding register file is paired, and each of the processing elements obtains the piece of data to be processed from the register file indicated in each piece of selection information.

With this arrangement, the parallel execution processor is able to allow each processing element to choose one of the register files in the pair from which the processing element obtains a piece of data to be processed.

Consequently, the parallel execution processor is able to increase the number of types of register files that can be designated by one instruction, and thereby, to increase the number of types of instructions that can be executed in parallel.

The present invention further provides an instruction assigning method for assigning instructions to a plurality of processing elements, comprising: an obtaining step of obtaining (i) a piece of group number information indicating how many groups the processing elements should be formed into and (ii) an instruction sequence including one or more instructions; a decoding step of decoding the obtained instruction sequence; a group forming step of forming the processing elements into as many groups as indicated by the piece of group number information; and an execution controlling step of assigning part or all of the instructions included in the decoded instruction sequence to the groups, so that one group receives one instruction, and controlling the processing elements so that (i) the instructions received by the groups are executed in parallel, and (ii) in each group, all processing elements in the group are employed in parallel for the execution of the received instruction.

With this arrangement, by using this instruction assigning method, it is possible to form the processing elements into one or more groups and assign the instructions to the groups.

Consequently, the parallel execution processor is able to, not only have all the processing elements execute one instruction, but also form the processing elements into groups so that different groups execute different instructions in parallel.

This way, since it is possible to execute, in parallel, a plurality of different instructions, as well as one instruction, it is possible to apply the parallel execution processor to a wider range of processing and to improve utilization efficiency.

The present invention also provides an instruction assigning method for assigning a first instruction and a second instruction to a plurality of processing elements, the instruction assigning method comprising: a storing step of (i) reading as many pieces of data as the number of processing elements, from a memory in which (a) pieces of data to be processed when a first instruction is executed and (b) piece of data to be processed when a second instruction is executed are arranged in an order according to a predetermined rule and (ii) storing the pieces of data, without changing the order, into register files each of which corresponds to a different one of the processing elements; an obtaining step of obtaining an instruction sequence that includes the first instruction and the second instruction; a decoding step of decoding the first instruction and the second instruction included in the obtained instruction sequence; and an execution controlling step of assigning (i) the first instruction to the processing elements corresponding to the register files that each store therein the piece of data to be processed when the first instruction is executed and (ii) the second instruction to the processing elements corresponding to the register files that each store therein the piece of data to be processed when the second instruction is executed, and controlling the processing elements so that (i) the first and the second instructions are executed in parallel, (ii) the processing elements executing the first instruction are employed in parallel for the execution, and (iii) the processing elements executing the second instruction are employed in parallel for the execution.

With this arrangement, when this assignment method is used, it is possible to take out of the memory and store into the register files, (i) the piece of data to be processed when the first instruction is executed and (ii) the piece of data to be processed when the second instruction is executed, which are arranged according to a predetermined rule, without having to change the order in which those pieces of data are arranged. Also, it is possible then to assign the first instruction and the second instructions to the processing elements.

Consequently, even when the memory stores therein both (i) pieces of data to be processed when the first instruction is executed and (ii) pieces of data to be processed when the second instruction is executed, which are arranged according to the predetermined rule, the parallel execution processor is able to load those pieces of data to registers all at once without having to change the order in which the pieces of data are arranged and have the instructions for the pieces of data executed in parallel.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 3 shows the internal structure of the instruction decoding unit 120;

FIG. 7 shows the two combination options that are stored in the combination storing unit 252;

FIGS. 11A and 11B show examples of grouping information that is to be obtained by the grouping information obtaining unit 353;

FIG. 19 shows the internal structures of the PE 130a, the PE 130b, and the switching unit 560a;

FIGS. 20A to 20D show how pieces of complex number data are stored in the memory 2 and the register files 140a, 140b, 140c, and 140d;

DESCRIPTION OF THE PREFERRED EMBODIMENTS

First Embodiment

General Outline

The parallel execution processor of the first embodiment of the present invention, at first, fetches apiece of instruction data. When the piece of instruction data includes only one instruction, the parallel execution processor assigns the one instruction to each of all the processing elements. When the piece of instruction data includes two instructions, the parallel execution processor forms the processing elements into two groups and assigns one instruction to each of the groups.

This way, since it is possible to execute not only one instruction but also two different instructions in parallel, it is possible to improve the utilization efficiency of the parallel execution processor.

The following explains in detail the parallel execution processor of the first embodiment.

Structure

Figure 1:
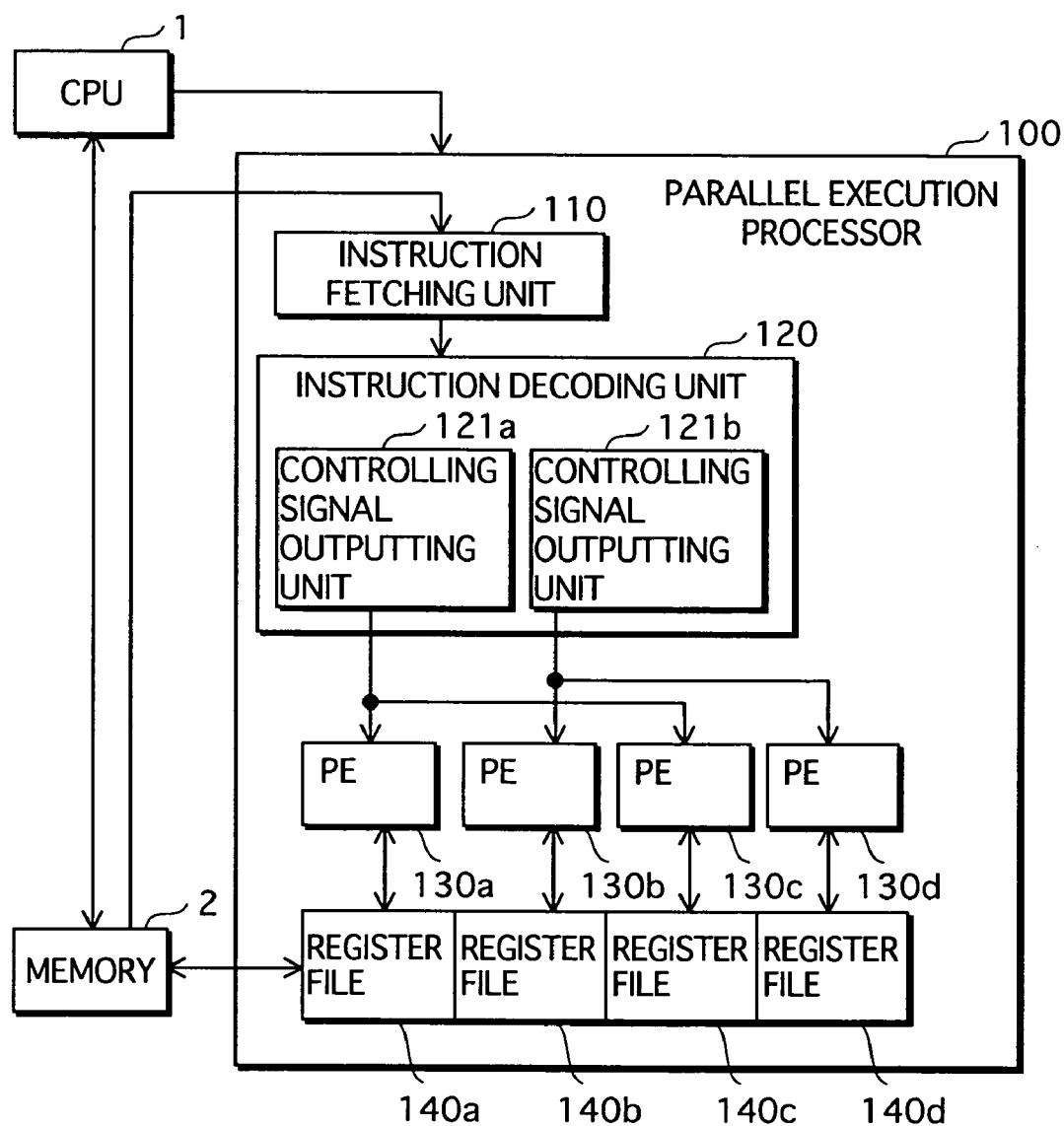
FIG. 1 shows the structure of a computer that includes the parallel execution processor of the first embodiment of the present invention.

FIG. 1 shows the structure of a computer that includes the parallel execution processor of the first embodiment of the present invention.

The computer shown in FIG. 1 comprises a CPU 1, a memory 2, and a parallel execution processor 100.

The CPU 1 controls the operations of the memory 2 and the parallel execution processor 100.

The memory 2 stores therein pieces of data that are to be processed as well as pieces of instruction data.

The parallel execution processor 100 is a coprocessor that operates according to an operational instruction from the CPU 1 and comprises an instruction fetching unit 110, an instruction decoding unit 120, as well as PEs 130a, 130b, 130c, 130d, and register files 140a, 140b, 140c, and 140d. Hereafter, a processing element will be referred to as a "PE". Normally, the number of PEs included in a parallel execution processor is a power of two, such as 64 or 128. In the present application, in order to keep it simple, the explanation is provided for a case where the parallel execution processor includes four PEs.

The instruction fetching unit 110 receives an operational instruction from the CPU 1 and fetches a piece of 32-bit instruction data from the memory 2.

FIGS. 2A to 2E show the data structures of pieces of instruction data that are to be fetched by the instruction fetching unit 110.

Each piece of instruction data is written in a machine language and is 32-bit long. The first 2 bits are a format field and the following 30 bits are a data field.

The positioning pattern is written in the format field and the positioning pattern denotes how the one or two instructions included in the data field are positioned. One or more OP codes and one or more operands, both of which correspond to the one or two instructions, are positioned in the data field. The positioning pattern written in the format field defines the order in which the OP codes and the operands are positioned, as well as the number of bits allocated to each of the OP codes and operands.

The following describes the data structures of pieces of instruction data, and explanation is provided individually for each positioning pattern.

Figure 2A:
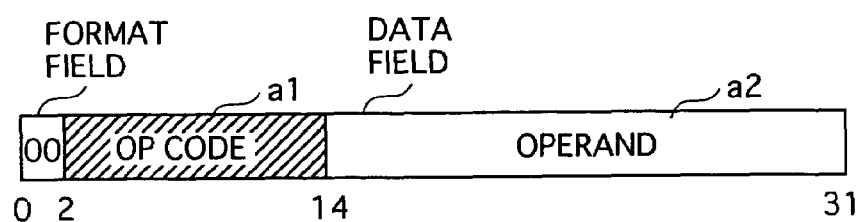
FIGS. 2A to 2E show the data structure of pieces of instruction data that are to be fetched by the instruction fetching unit 110.

FIG. 2A shows the data structure of a piece of instruction data with the "0b00" positioning pattern.

Here, in an expression of "0bxx", "xx" is a value expressed according to the binary system.

The format field of this piece of instruction data indicates "0b00". The data field includes a 12-bit OP code and an 18-bit operand. This means that the piece of instruction data includes an instruction made up of the OP code a1 and the operand a2.

Figure 2B:
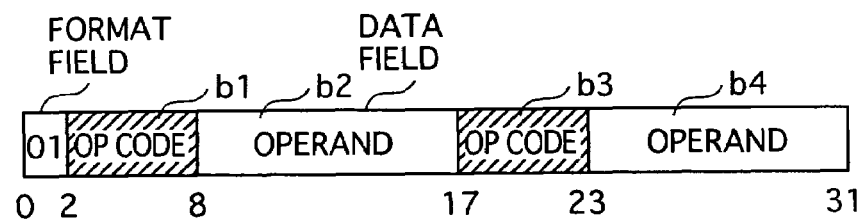

FIG. 2B shows the data structure of a piece of instruction data with the "0b01" positioning pattern.

The format field of this piece of instruction data indicates "0b01". The data field includes two 6-bit OP codes and two 9-bit operands. This means that the piece of instruction data includes two instructions: namely, one instruction made up of the OP code b1 and the operand b2; and another instruction made up of the OP code b3 and the operand b4.

Figure 2C:
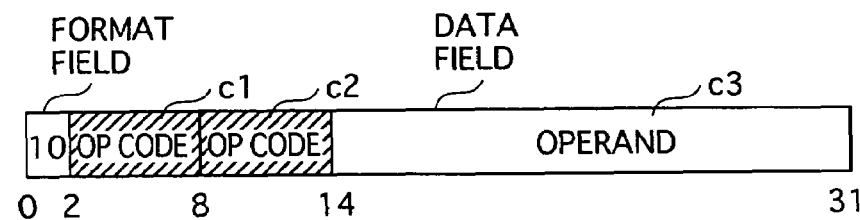

FIG. 2C shows the data structure of a piece of instruction data with the "0b10" positioning pattern.

The format field of this piece of instruction data indicates "0b10". The data field includes two 6-bit OP codes and an 18-bit operand. This means that the piece of instruction data includes two instructions: namely, one instruction made up of the OP code c1 and the operand c3; and another instruction made up of the OP code c2 and the operand c3.

Figure 2D:
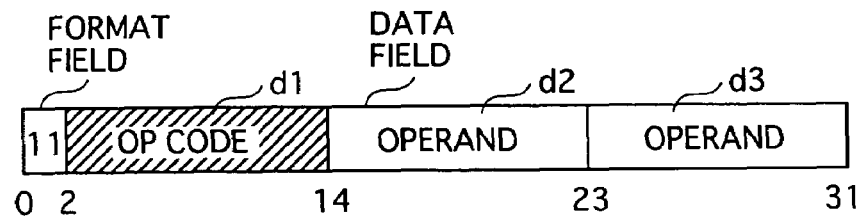
Figure 2E:
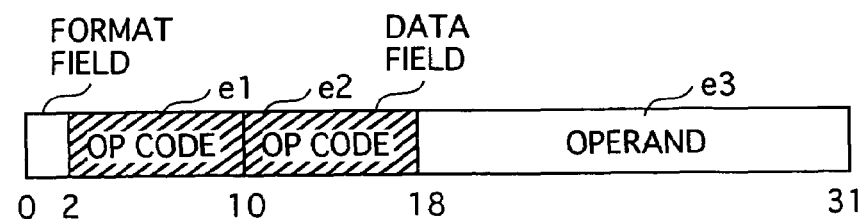

FIG. 2D shows the data structure of a piece of instruction data with the "0b11" positioning pattern.

The format field of this piece of instruction data indicates "0b11". The data field includes a 12-bit OP code and two 9-bit operands. This means that the piece of instruction data includes two instructions: namely, one instruction made up of the OP code d1 and the operand d2; and another instruction made up of the OP code d1 and the operand d3.

Of these data structures, when the parallel execution processor 100 has one instruction executed in parallel, the piece of instruction data has the data structure shown in FIG. 2A. When the parallel execution processor 100 has two instructions executed in parallel, the piece of instruction data has the data structure shown in one of FIGS. 2B, 2C, and 2D.

Each piece of instruction data mentioned above is different from another with respect to (i) the number of instructions that can be designated and (ii) the number of registers that can be designated, both of which could vary depending on the number of bits allocated to each of the OP codes and the operands. The following describes an example with an addition instruction "ADD r2, r0, r1", which means the result of adding the register r0 to the register r1 will be stored into the register r2.

When an addition instruction is to be executed, an operand needs to designate a destination register and two source registers. In such a case, according to the data structure shown in FIG. 2A, since the operand section has 18 bits, 6 bits will be allocated to each register. In other words, the operand is able to designate 64 registers from Number 0 to Number 63 to each of the destination and source registers. According to the data structure shown in FIG. 2D, since the operand section has 9 bits, 3 bits will be allocated to each register. In other words, the operand is able to designate 8 registers with register numbers 0 to 7 to each of the destination registers and the source registers.

The instruction decoding unit 120 generates controlling signals from a piece of instruction data fetched by the instruction fetching unit 110, and outputs the controlling signals to the PEs. Here, a controlling signal is a signal that instructs each PE to operate, and more specifically, it is a signal that controls functional units and data paths in each PE.

The instruction decoding unit 120 includes two controlling signal outputting units, 121a and 121b. When a piece of instruction data has the data structure shown in FIG. 2A, the controlling signals outputted via the controlling signal outputting units 121a and 121b are the same. When a piece of instruction data has the data structure shown in one of FIGS. 2B, 2C, and 2D, the controlling signals outputted via the controlling signal outputting units 121a and 121b are different from each other. The following explains the internal structure of the instruction decoding unit.

FIG. 3 shows the internal structure of the instruction decoding unit 120.

The instruction decoding unit 120 includes decoding subunits 122a, 122b, 122c, and 122d, as well as controlling signal outputting units 121a and 121b.

Out of a piece of instruction data fetched by the instruction fetching unit 110, the instruction decoding unit 120 provides the 2 bits in the format field for each of the controlling signal outputting units 121a and 121b, and provides the 30 bits in the data field for each of the decoding subunits 122a, 122b, 122c, and 122d.

The decoding subunit 122a is used exclusively for the data structure shown in FIG. 2A. The decoding subunit 122a decodes the first 12 bits in the data field as an OP code and the following 18 bits as an operand so as to generate two controlling signals that are identical.

The generated controlling signals will be individually provided for the controlling signal outputting units 121a and 121b, respectively.

The decoding subunit 122b is used exclusively for the data structure shown in FIG. 2B. The decoding subunit 122b decodes the first 6 bits in the data field as an OP code, the following 9 bits as an operand, the following 6 bits as another OP code, and the following 9 bits as another operand, so as to generate two controlling signals.

The controlling signal generated from the OP code b1 and the operand b2 will be provided for the controlling signal outputting unit 121a. The controlling signal generated from the OP code b3 and the operand b4 will be provided for the controlling signal outputting unit 121b.

The decoding subunit 122c is used exclusively for the data structure shown in FIG. 2C. The decoding subunit 122c decodes the first 6 bits in the data field as an OP code, the following 6 bits as another OP code, and the following 18 bits as an operand, so as to generate two controlling signals.

The controlling signal generated from the OP code c1 and the operand c3 will be provided for the controlling signal outputting unit 121a. The controlling signal generated from the OP code c2 and the operand c3 will be provided for the controlling signal outputting unit 121b.

The decoding subunit 122d is used exclusively for the data structure shown in FIG. 2D. The decoding subunit 122d decodes the first 12 bits in the data field as an OP code, the following 9 bits as an operand, and the following 9 bits as another operand, so as to generate two controlling signals.

The controlling signal generated from the OP code d1 and the operand d2 will be provided for the controlling signal outputting unit 121a. The controlling signal generated from the OP code d1 and the operand d3 will be provided for the controlling signal outputting unit 121b.

Each of the controlling signal outputting units 121a and 121b selectively outputs one of the controlling signals inputted into the input terminals a, b, c, and d, according to the two bits in the format field.

For example, when the format field indicates "0b00", the controlling signal inputted into the input terminal a will be outputted. When the format field indicates "0b01", the controlling signal inputted into the input terminal b will be outputted.

As a result, when a piece of instruction data includes one instruction, the controlling signals outputted by the instruction decoding unit 120 via the controlling signal outputting units 121a and 121b are the same. When a piece of instruction data includes two instructions, the controlling signals outputted by the instruction decoding unit 120 via the controlling signal outputting units 121a and 121b are different from each other.

The PEs 130a, 130b, 130c, and 130d are processing elements, and execute instructions in parallel according to the controlling signals provided by the instruction decoding unit 120. As shown in FIG. 1, the PEs 130a and 130c receive controlling signals via the controlling signal outputting unit 121a. The PEs 130b and 130d receive controlling signals via the controlling signal outputting unit 121b. Accordingly, when the controlling signals outputted via the controlling signal outputting units 121a and 121b are the same, the instructions executed by the PEs 130a, 130b, 130c, and 130d are the same. Conversely, when the controlling signals outputted from the controlling signal outputting units 121a and 121b are different from each other, the instruction executed by the first group made up of the PEs 130a and 130c is different from the second group made up of the PEs 130b and 130d.

The data to be processed in execution of instructions will be obtained from the register files 140a, 140b, 140c, and 140d, each of which corresponds to a different one of the PEs.

The register files 140a, 140b, 140c, and 140d each store therein pieces of data that have been read from the memory 2 according to a load instruction.

In some cases, the memory 2 stores therein pieces of data together on each of which one type of operation is to be performed. In other cases, the memory 2 stores therein pieces of data in such a manner that (a) pieces of data to be processed in one type of operation and (b) pieces of data to be processed in another type of operation alternate. In either case, the load instruction instructs that the pieces of data get stored into the register files 140a, 140b, 140c, and 140d without changing the order in which the pieces of data are arranged in the memory 2. When the pieces of data for one type of operation are stored together, the parallel execution processor 100 is able to have all the PEs 130a, 130b, 130c, and 130d respectively execute one type of operation. When the pieces of data for two types of operation are arranged so that they alternate, the parallel execution processor 100 is able to have the first group made up of the PEs 130a and 130c and the second group made up of the PEs 130b and 130d execute operation instructions that are different from each other.

In addition, when the controlling signals outputted from the controlling signal outputting units 121a and 121b are different from each other, and one of them is an "idle" controlling signal indicating an operational halt, the two PEs that have received the "idle" controlling signal will halt operation.

Operation

The following explains the operation performed by the parallel execution processor 100 with the aforementioned structure.

Figure 4:
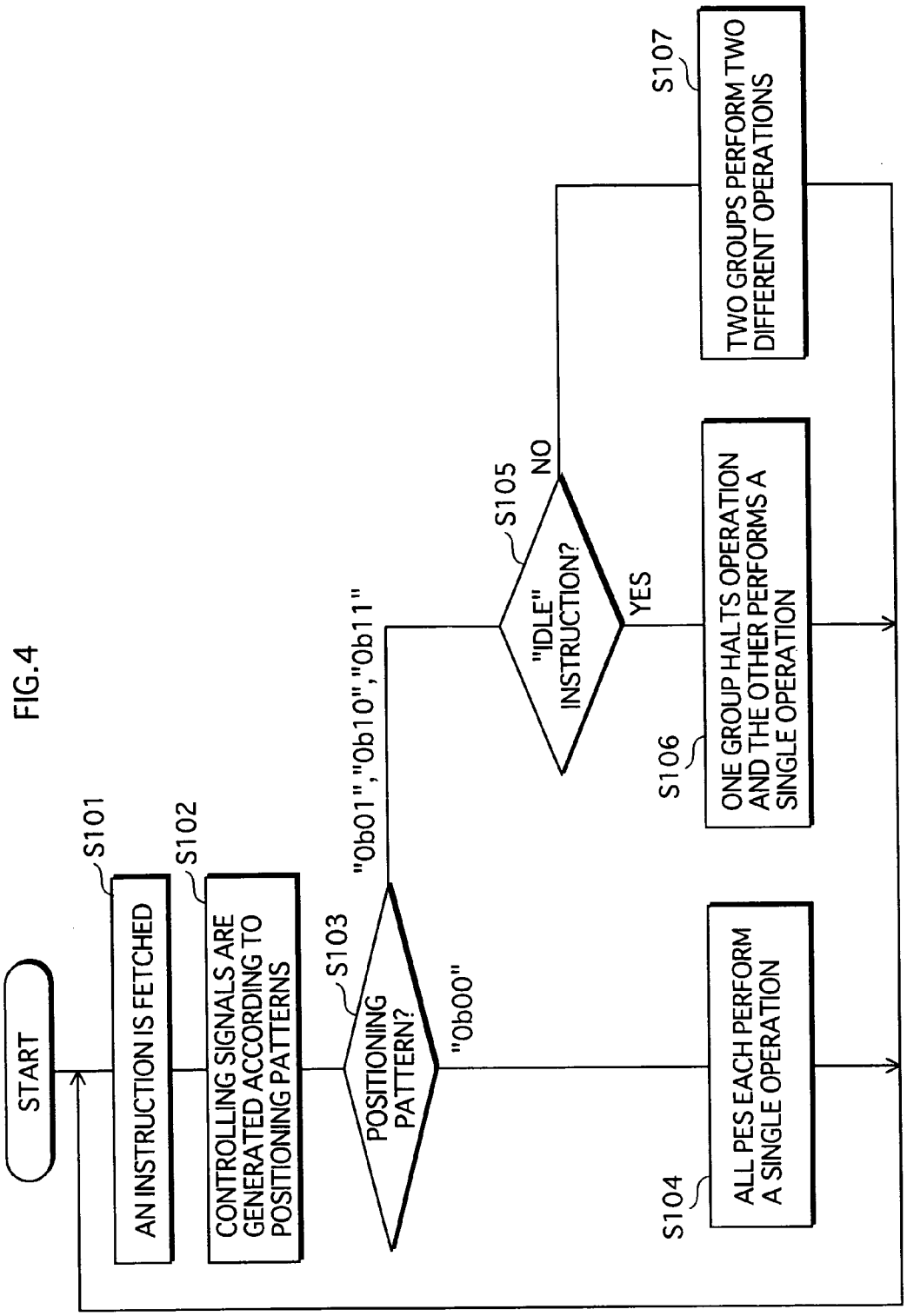
FIG. 4 shows the operational flow of the parallel execution processor 100 of the first embodiment of the present invention.

FIG. 4 shows the operational flow of the parallel execution processor 100 of the first embodiment.

Step S101: The instruction fetching unit 110 fetches a piece of instruction data.

Step S102: The instruction decoding unit 120 generates controlling signals from the piece of instruction data fetched by the instruction fetching unit 110. At this time, the instruction decoding unit 120 generates these controlling signals in parallel at decoding subunit 122a, 122b, 122c, and 122d. The decoding subunit 122a decodes the piece of instruction data according to the "0b00" positioning pattern and generates two controlling signals. The decoding subunit 122b decodes the piece of instruction data according to the "0b01" positioning pattern and generates two controlling signals. The decoding subunit 122c decodes the piece of instruction data according to the "0b10" positioning pattern and generates two controlling signals. The decoding subunit 122d decodes the piece of instruction data according to the "0b11" positioning pattern and generates two controlling signals.

Step S103: The instruction decoding unit 120 extracts the positioning pattern indicated in the format field of the piece of instruction data and selects one of the decoding subunits 122a, 122b, 122c, and 122d according to the indicated positioning pattern.

Step S104: When the positioning pattern is indicated as "0b00" in Step S103, the instruction decoding unit 120 extracts one instruction from the piece of instruction data, decodes it, and generates two controlling signals that are identical. The generated controlling signals will be individually outputted via the controlling signal outputting units 121a and 121b, respectively, in parallel. The PEs 130a, 130b, 130c, and 130d respectively execute one same operation in parallel according to the outputted controlling signals.

Step S105: When the positioning pattern is indicated as one of "0b01", "0b10", and "0b11" in Step S103, the instruction decoding unit 120 extracts two instructions from the piece of instruction data, decodes them, and generates two controlling signals. These two controlling signals will be individually outputted via the controlling signal outputting units 121a and 121b, respectively, in parallel. The first PE group and the second PE group each receive the controlling signal and judge whether the controlling signal instructs "Idle" or not.

Step S106: When one of the first PE group and the second PE group has received an "Idle" instruction in Step S105 (S105: Yes), the PEs belonging to the group that has received the "Idle" instruction halt operation, and the PEs belonging to the other group that has not received the "Idle" instruction respectively execute one operation in parallel.

Step S107: When neither of the first PE group and the second PE group has received an "Idle" instruction in Step S105 (S105: No), the PEs in the first group and the PEs in the second group respectively execute two different operations in parallel.

As explained so far, the parallel execution processor 100 fetches a piece of instruction data and has all the PEs 130a, 130b, 130c, and 130d execute one or more instructions in parallel. Here, when the piece of instruction data includes one instruction, the parallel execution processor 100 assigns the one instruction to each of all the PEs. When the piece of instruction data includes two instructions, the parallel execution processor 100 forms all of the PEs into two groups and assigns one instruction to each of the groups.

Accordingly, by making it possible to execute in parallel not only one instruction but also two different instructions, it is possible to improve the utilization efficiency of the parallel execution processor 100.

In addition, when the parallel execution unit 100 executes two different instructions, it is arranged so that one of the instructions is executed by the PEs 130a and 130c and the other instruction is executed by the PEs 130b and 130d. With this arrangement, even if the memory 2 stores therein pieces of data in such a manner that (a) pieces of data to be processed in one type of operation and (b) pieces of data to be processed in another type of operation alternate, the parallel execution processor 100 is able to load all the pieces of data at once from the memory 2 to the register files 140a, 140b, 140c, and 140d, without having to change the order in which these pieces of data are arranged, so as to execute in parallel the instructions intended for the different pieces of data. As for pieces of data that are to be processed according to two different instructions and are arranged so that they alternate in the memory 2, examples include complex number data (a piece of real number data and a piece of imaginary number data are arranged alternately), and audio data (a piece of left stereo signal data and a piece of right stereo signal data arranged alternately).

It should be noted that the structures of the pieces of instruction data explained above are mere examples, and it is acceptable to apply the present invention to other data structures. For example, when a piece of instruction data includes two OP codes and an operand, it is acceptable that the piece of instruction data has the structure shown in FIG. 2E, instead of the one shown in FIG. 2C. In the structure shown in FIG. 2E, a smaller number of bits are allocated to the operand, and a larger number of bits are allocated to the OP codes. As a result, compared to the case show in FIG. 2C, the number of registers to be designated by the operand is reduced, but the number of types of instructions to be designated by the OP codes is increased.

Further, in the explanation above, the controlling signals outputted via the controlling signal outputting unit 121a are inputted into the PEs 130a and 130c, and the ones outputted via the controlling signal outputting unit 121b are inputted into the PEs 130b and 130d; however, it is acceptable to have other arrangements depending on how the pieces of data to be processed are arranged. For example, it is also acceptable to have an arrangement wherein the controlling signals outputted via the controlling signal outputting unit 121a are inputted into the PEs 130a and 130b, and the ones outputted via the controlling signal outputting unit 121b are inputted into the PEs 130c and 130d.

Second Embodiment

General Outline

With the parallel execution processor 100 of the first embodiment, the grouping procedure to form the PEs 130a, 130b, 130c, and 130d into two groups is fixed. With the parallel execution processor of the second embodiment of the present invention, it is possible to dynamically select a grouping procedure from among predetermined options.

By making it possible to dynamically select a grouping procedure like this, it is possible to further improve the utilization efficiency of a parallel execution processor.

The following describes in detail the parallel execution processor of the second embodiment.

Structure

Figure 5:
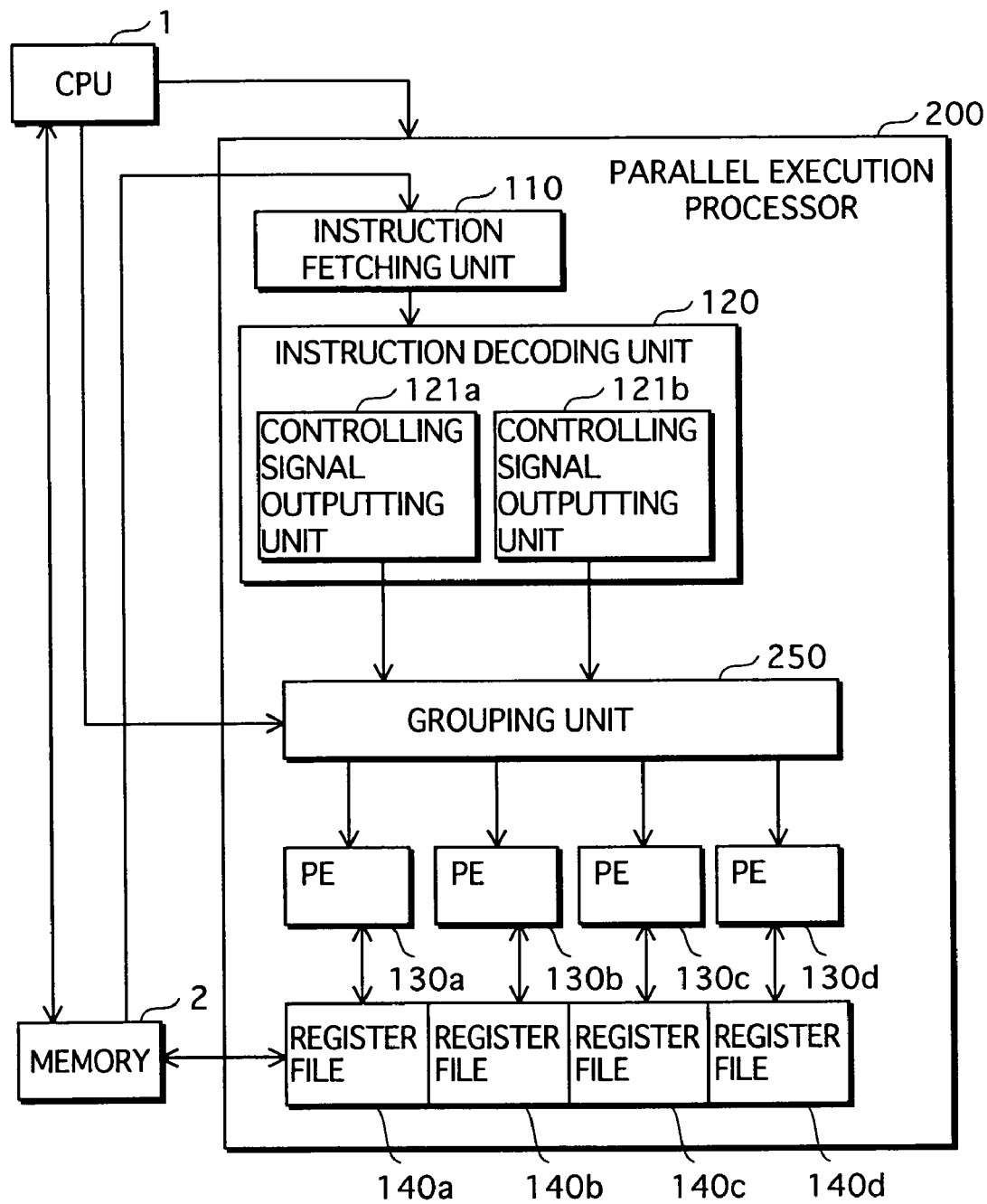
FIG. 5 shows the structure of a computer that includes the parallel execution processor of the second embodiment of the present invention.

FIG. 5 shows the structure of a computer that includes the parallel execution processor of the second embodiment.

As seen from the structure of the parallel execution processor 200 shown in FIG. 5, a grouping unit 250 is added to the structure of the parallel execution processor 100 of the first embodiment. The components included also in the parallel execution processor 100 have the same reference characters as in FIG. 1, and explanation for those will be omitted.

The grouping unit 250 forms the PEs 130a, 130b, 130c, and 130d into a first group and a second group according to a grouping procedure selected by CPU1 from among predetermined grouping procedure options. The controlling signals outputted via the controlling signal outputting units 121a and 121b will be individually provided for the first PE group and the second PE group, respectively.

Figure 6:
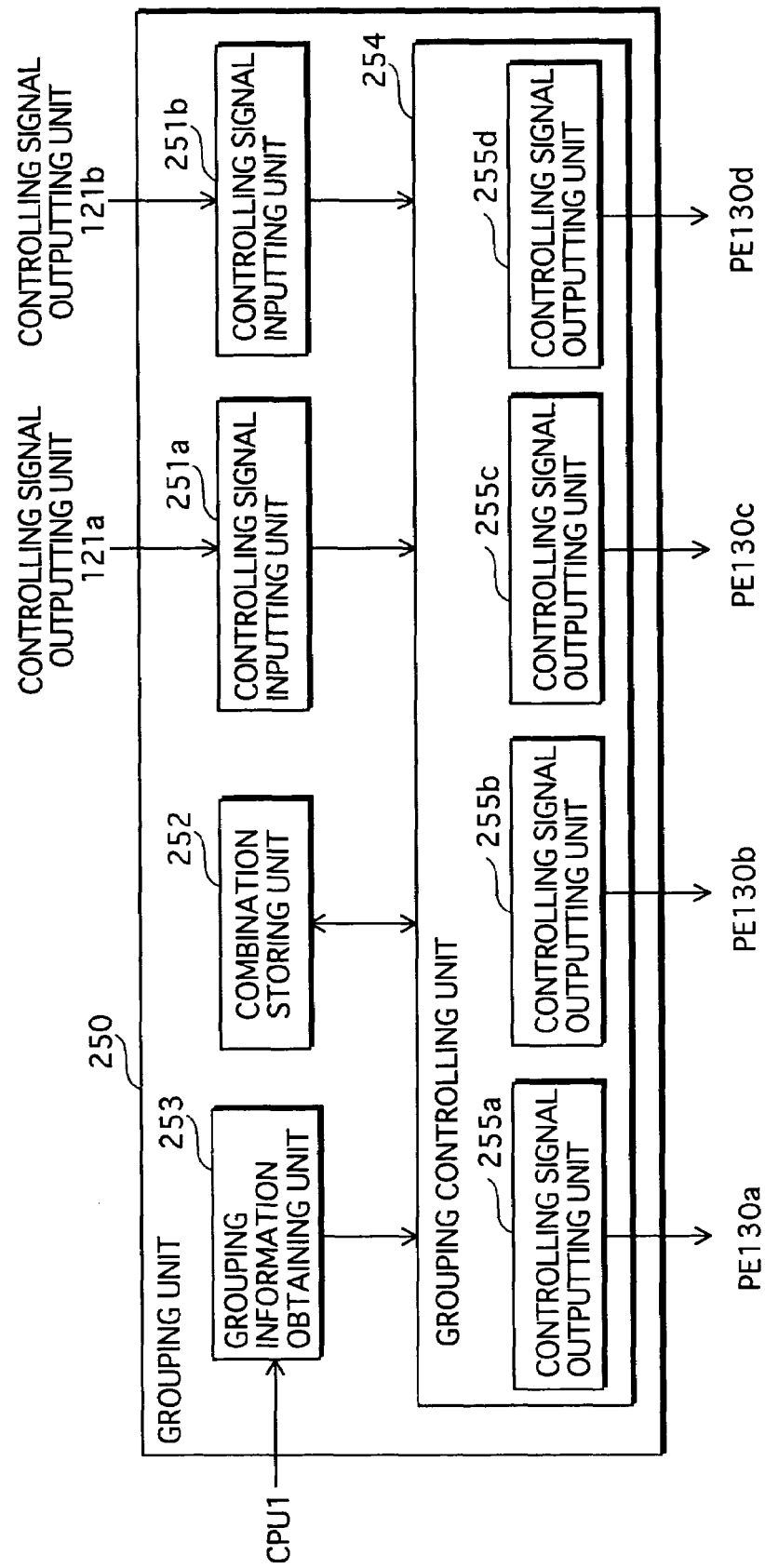
FIG. 6 shows the internal structure of the grouping unit 250.

FIG. 6 shows the internal structure of the grouping unit 250.

The grouping unit 250 includes controlling signal inputting units 251a and 251b, a combination storing unit 252, a grouping information obtaining unit 253, and a grouping controlling unit 254. The grouping controlling unit 254 includes controlling signal outputting units 255a, 255b, 255c, and 255d.

The controlling signal inputting unit 251a is connected with the controlling signal outputting unit 121a. The controlling signal inputting unit 251b is connected with the controlling signal outputting unit 121b.

The controlling signal outputting units 255a, 255b, 255c, and 255d inside the grouping controlling unit 254 are connected to the PEs 130a, 130b, 130c, and 130d respectively.

The combination storing unit 252 is a ROM and stores therein two combination options based on which ones of the controlling signal outputting units 255a, 255b, 255c, and 255d, are connected to each of the controlling signal inputting unit 251a and 251b.

FIG. 7 shows the two combination options that are stored in the combination storing unit 252.

The two combination options are Combination A which corresponds to the piece of grouping information "0b00" and Combination B which corresponds to the piece of grouping information "0b01".

Combination A denotes that the controlling signal inputting unit 251a is connected to the controlling signal outputting units 255a and 255c, and the controlling signal inputting unit 251b is connected to the controlling signal outputting units 255b and 255d.

Combination B denotes that the controlling signal inputting unit 251a is connected to the controlling signal outputting units 255a and 255b, and the controlling signal inputting unit 251b is connected to the controlling signal outputting units 255c and 255d.

The grouping information obtaining unit 253 obtains, from the CPU 1, one of the pieces of grouping information "0b00" and "0b01", which respectively indicate that "Combination A should be selected" and "Combination B should be selected".

The grouping controlling unit 254 receives the piece of grouping information obtained by the grouping information obtaining unit 253, and selects one of Combination A and Combination B.

Accordingly, when the piece of grouping information is "0b00", the grouping unit 250 outputs the controlling signals inputted into the controlling signal inputting unit 251a via the controlling signal outputting units 255a and 255c; and the grouping unit 250 outputs the controlling signals inputted into the controlling signal inputting unit 251b via the controlling signal outputting units 255b and 255d.

Conversely, when the piece of grouping information is "0b01", the grouping unit 250 outputs the controlling signals inputted into the controlling signal inputting unit 251a via the controlling signal outputting units 255a and 255b; and the grouping unit 250 outputs the controlling signals inputted into the controlling signal inputting unit 251b via the controlling signal outputting units 255c and 255d.

With this arrangement, when having two different instructions executed by the PEs 130a, 130b, 130c, and 130d, the parallel execution processor 200 is able to select one from the following: the PEs 130a, 130b, 130c, and 130d are arranged so that (a) the PEs executing one instruction and the PEs executing the other instruction alternate, or (b) the PEs executing one instruction are positioned together on one side and the PEs executing the other instruction are positioned together on the other side.

In addition, when the controlling signals outputted from the controlling signal outputting units 121a and 121b are different from each other, and when one of the controlling signals is an "idle" controlling signal indicating an operational halt, the two PEs that have received the "idle" controlling signal will halt operation.

In such cases, when the piece of grouping information is "0b00", the PEs 130a, 130b, 130c, and 130d are arranged in such a manner that the PEs that halt operation and the PEs that do not halt operation alternate. When the piece of grouping information is "0b01", the PEs 130a, 130b, 130c, and 130d are arranged in such a manner that the PEs that halt operation are positioned together on one side and the PEs that do not halt operation are positioned together on the other side.

Operation

The following explains the operation performed by the parallel execution processor 200 with the aforementioned structure.

Figure 8:
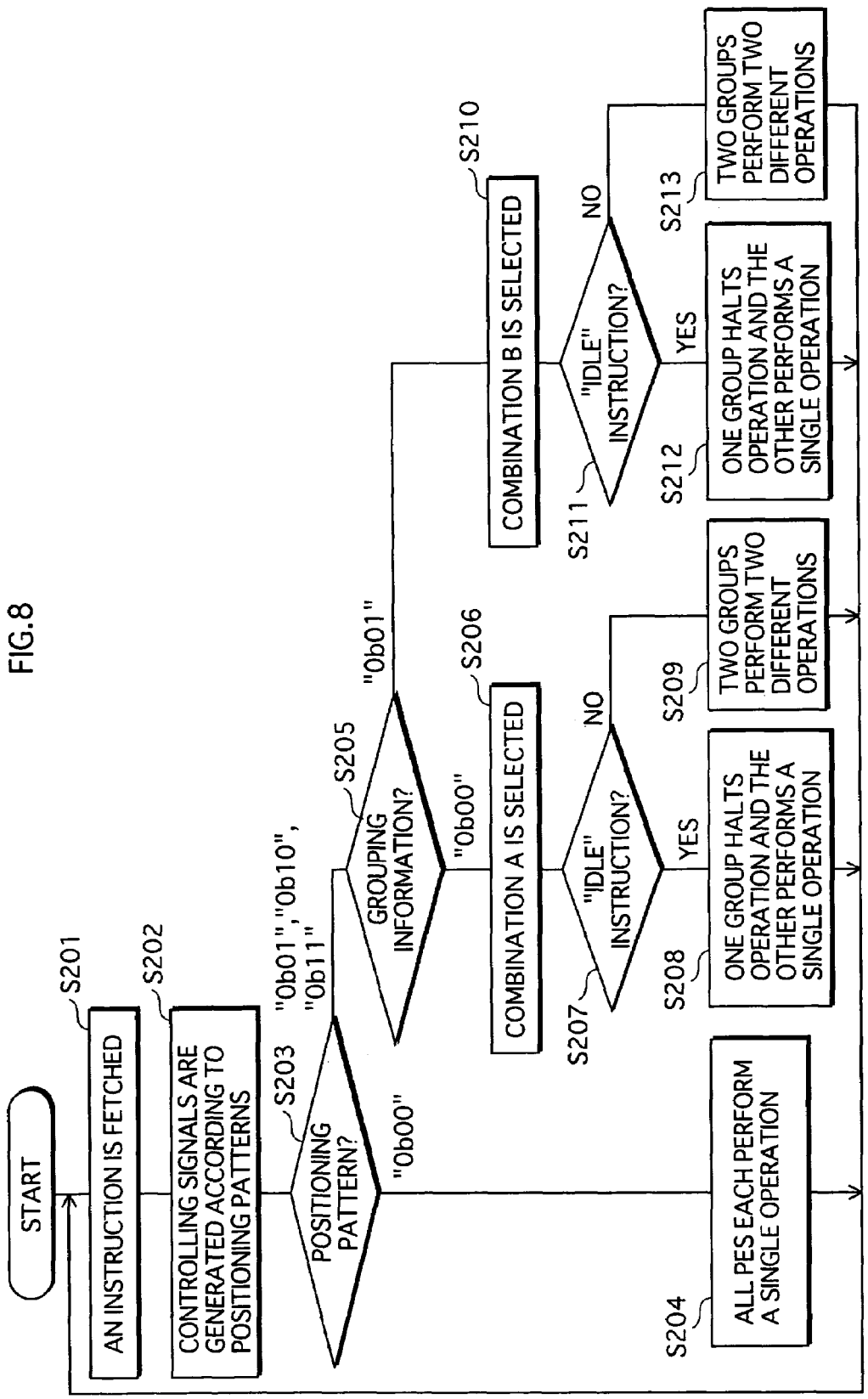
FIG. 8 shows the operational flow of the parallel execution processor 200 of the second embodiment of the present invention.

FIG. 8 shows the operational flow of the parallel execution processor 200 of the second embodiment.

Step S201: The instruction fetching unit 110 fetches a piece of instruction data.

Step S202: The instruction decoding unit 120 generates controlling signals from the piece of instruction data fetched by the instruction fetching unit 110, according to the positioning patterns, "0b00", "0b01", "0b10", and "0b11".

Step S203: The instruction decoding unit 120 extracts the positioning pattern indicated in the format field of the piece of instruction data and selects one of the decoding subunits 122a, 122b, 122c, and 122d, according to the indicated positioning pattern.

Step S204: When the positioning pattern is indicated as "0b00" in Step S203, the instruction decoding unit 120 extracts one instruction from the piece of instruction data, decodes it, and generates two controlling signals that are identical. The generated controlling signals will be individually outputted via the controlling signal outputting units 121a and 121b, respectively, in parallel. The PEs 130a, 130b, 130c, and 130d respectively execute one same operation in parallel according to the outputted controlling signals.

Step S205: When the positioning pattern is indicated as one of "0b01", "0b10", and "0b11" in Step S203, the grouping unit 250 obtains a piece of grouping information from the CPU Step S206: When the piece of grouping information is "0b00" in Step S205, the grouping unit 250 selects Combination A.

The instruction decoding unit 120 extracts two instructions from the piece of instruction data, decodes them, and generates two controlling signals. These two controlling signals will be individually outputted via the controlling signal outputting units 121a and 121b, respectively, in parallel.

Step S207: The first PE group and the second PE group, that are of Combination A, each receive the controlling signal and judge whether the controlling signal instructs "Idle" or not.

Step S208: When one of the first PE group and the second PE group has received an "Idle" instruction in Step S207 (S207: Yes), the PEs belonging to the group that has received the "Idle" instruction halt operation, and the PEs belonging to the other group that has not received the "Idle" instruction respectively execute one operation in parallel.

Step S209: When neither of the first PE group and the second PE group has received an "Idle" instruction in Step S207 (S207: No), the PEs in the first group and the PEs in the second group respectively execute two different operations in parallel.

Step S210: When the piece of grouping information is "0b01" in Step S205, the grouping unit 250 selects Combination B.

The instruction decoding unit 120 extracts two instructions from the piece of instruction data, decodes them, and generates two controlling signals. These two controlling signals will be individually outputted via the controlling signal outputting units 121a and 121b, respectively, in parallel.

Step S211: The first PE group and the second PE group, that are of Combination B, each receive the controlling signal and judge whether the controlling signal instructs "Idle" or not.

Step S212: When one of the first PE group and the second PE group has received an "Idle" instruction in Step S211 (S211: Yes), the PEs belonging to the group that has received the "Idle" instruction halt operation, and the PEs belonging to the other group that has not received the "Idle" instruction respectively execute one operation in parallel.

Step S213: When neither of the first PE group and the second PE group has received an "Idle" instruction in Step S211 (S211: No), the PEs in the first group and the PEs in the second group respectively execute two different operations in parallel.

As explained so far, the parallel execution processor 200 is able to dynamically select a grouping procedure from among the predetermined options, when the PEs 130a, 130b, 130c, and 130d are to be formed into two groups.

With this arrangement, it is possible to improve the utilization efficiency of a parallel execution processor.

Additionally, it is also acceptable to have an arrangement wherein the combination options stored in the combination storing unit 252 are rewritable by reprogramming them.

Third Embodiment

General Outline

With the parallel execution processor of the second embodiment of the present invention, it is possible to dynamically select a grouping procedure from among predetermined options, when the PEs 130a, 130b, 130c, and 130d are to be formed into two groups. With a parallel execution processor of the third embodiment, it is possible to freely determine, for each of the PEs, to which group the PE belongs, instead of selecting a grouping procedure from among predetermined options.

By making it possible to determine, for each of the PEs, to which group the PE belongs, it is possible to achieve a more attentive grouping process, and further possible to improve the utilization efficiency of a parallel execution processor.

The following explains in detail the parallel execution processor of the third embodiment.

Structure

Figure 9:
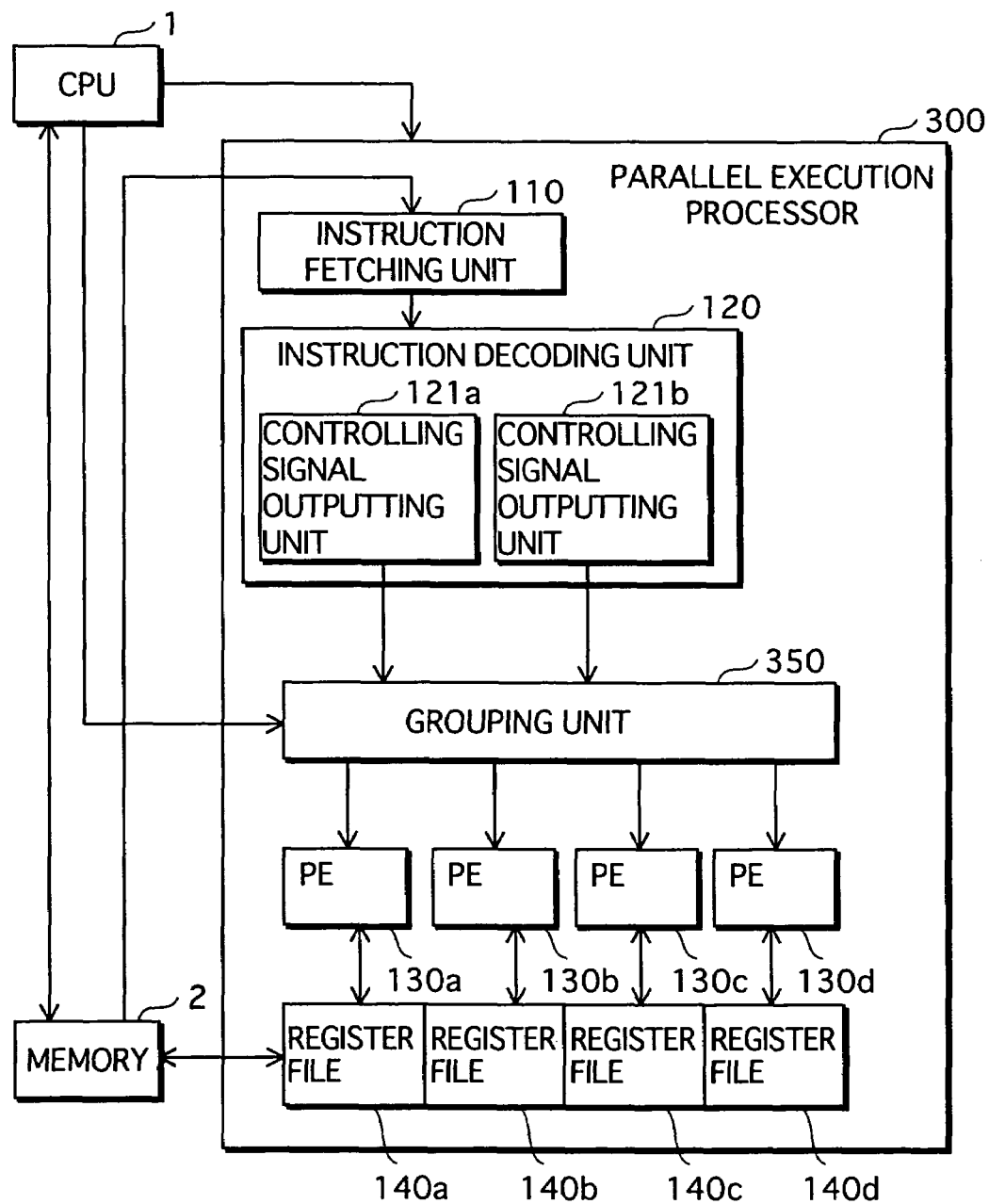
FIG. 9 shows the structure of a computer that includes the parallel execution processor of the third embodiment of the present invention.

FIG. 9 shows the structure of a computer that includes the parallel execution processor of the third embodiment.

As seen from the structure of the parallel execution processor 300 shown in FIG. 9, a grouping unit 350 is provided instead of the grouping unit 250 of the second embodiment. The components included also in the parallel execution processor 200 have the same reference characters as in FIG. 5, and explanation for those will be omitted.

The grouping unit 350 obtains, from the CPU 1, a piece of grouping information indicating, for each of the PEs 130a, 130b, 130c, and 130d, to which of the groups the PE should belong, and forms the PEs 130a, 130b, 130c, and 130d into a first group and a second group according to the piece of grouping information. The controlling signals outputted via the controlling signal outputting units 121a and 121b will be individually provided for the first PE group and the second PE group, respectively.

Figure 10:
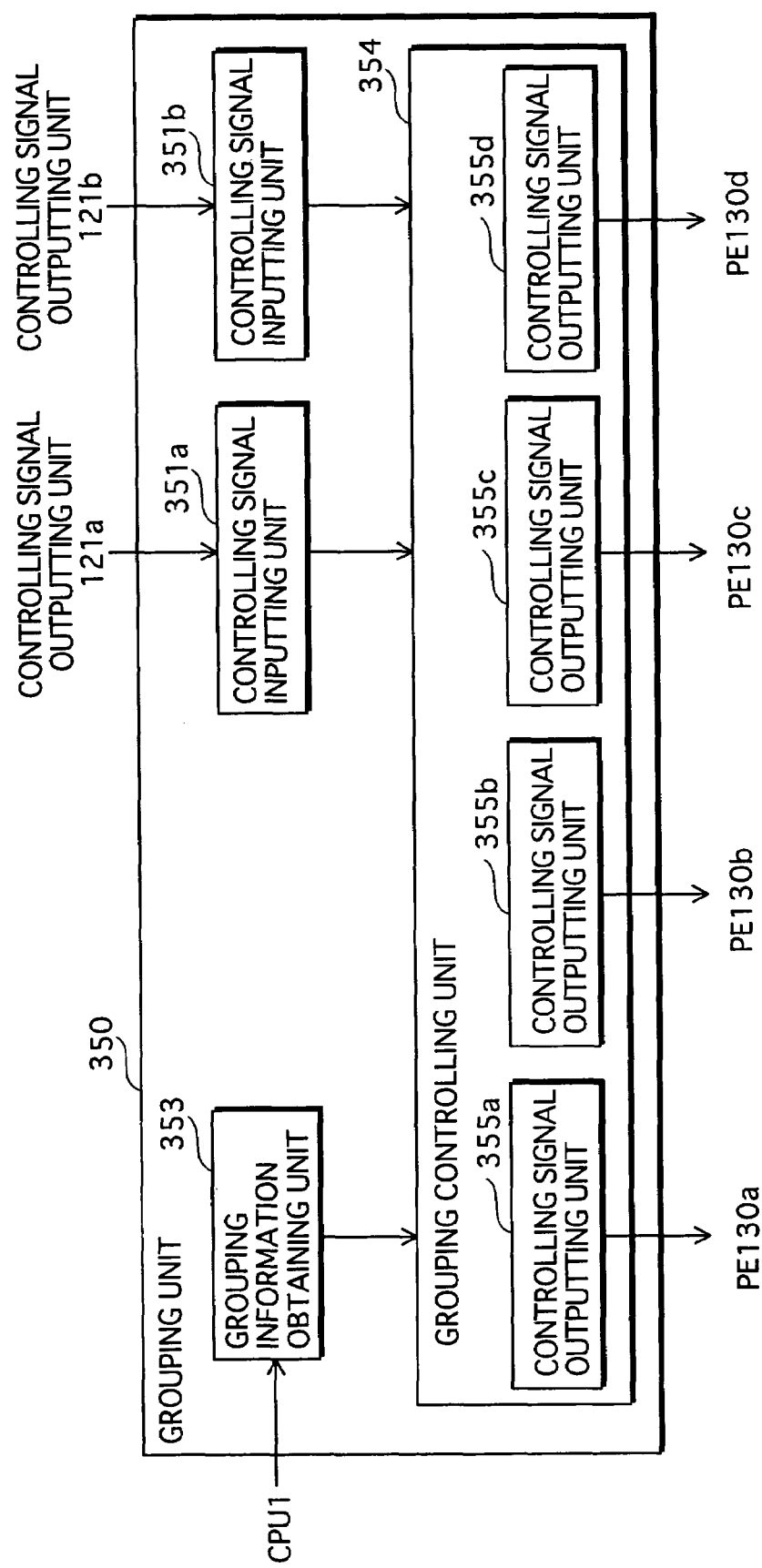
FIG. 10 shows the internal structure of the grouping unit 350.

FIG. 10 shows the internal structure of the grouping unit 350.

The grouping unit 350 includes controlling signal inputting units 351a and 351b, a grouping information obtaining unit 353, and a grouping controlling unit 354. The grouping controlling unit 354 includes controlling signal outputting units 355a, 355b, 355c, and 355d.

The controlling signal inputting unit 351a is connected with the controlling signal outputting unit 121a. The controlling signal inputting unit 351b is connected with the controlling signal outputting unit 121b.

The controlling signal outputting units 355a, 355b, 355c, and 355d included in the grouping controlling unit 354 are connected to the PEs 130a, 130b, 130c, and 130d, respectively.

The grouping information obtaining unit 353 obtains, from the CPU 1, a piece of grouping information indicating, for each of the PEs 130a, 130b, 130c, and 130d, to which group the PE should belong.

Figures 11A, 11B:
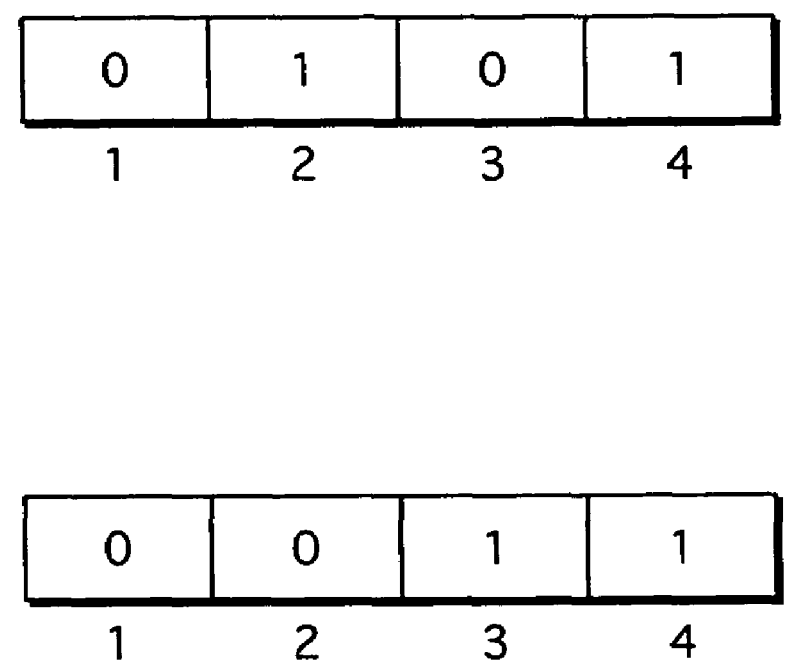

FIGS. 11A and 11B show examples of grouping information that is to be obtained by the grouping information obtaining unit 353.

Each piece of grouping information is 4 bits long. The first bit corresponds to the PE 130a, the second bit to the PE 130b, the third bit to the PE 130c, and the fourth bit to the PE 130d. The bit value "0b0" indicates "belonging to the first group". The bit value "0b1" indicates "belonging to the second group".

FIG. 11A shows an example of grouping information for a case where the PEs 130a and 130c belong to the first group, and the PEs 130b and 130d belong to the second group.

FIG. 11B shows an example of grouping information for a case where the PEs 130a and 130b belong to the first group, and the PEs 130c and 130d belong to the second group.

Having received the piece of grouping information obtained by the grouping information obtaining unit 353, the grouping controlling unit 354 forms each PE into one of the groups.

With this arrangement, when two different instructions are executed by the PEs 130a, 130b, 130c, and 130d, the parallel execution processor 300 is able to form the PEs 130a, 130b, 130c, and 130d into groups according to the piece of grouping information, so that the groups respectively execute instructions that are different from each other.

In addition, the controlling signals outputted from the controlling signal outputting units 121a and 121b are different from each other, and one of them is an "idle" controlling signal indicating an operational halt, the two PEs that have received the "idle" controlling signal will halt operation.

In such a case, when the piece of grouping information is "0b0101", the PEs are arranged so that the PEs that halt operation and the PEs that do not halt operation alternate.

Operation

The following explains the operation performed by the parallel execution processor 300 with the aforementioned structure.

Figure 12:
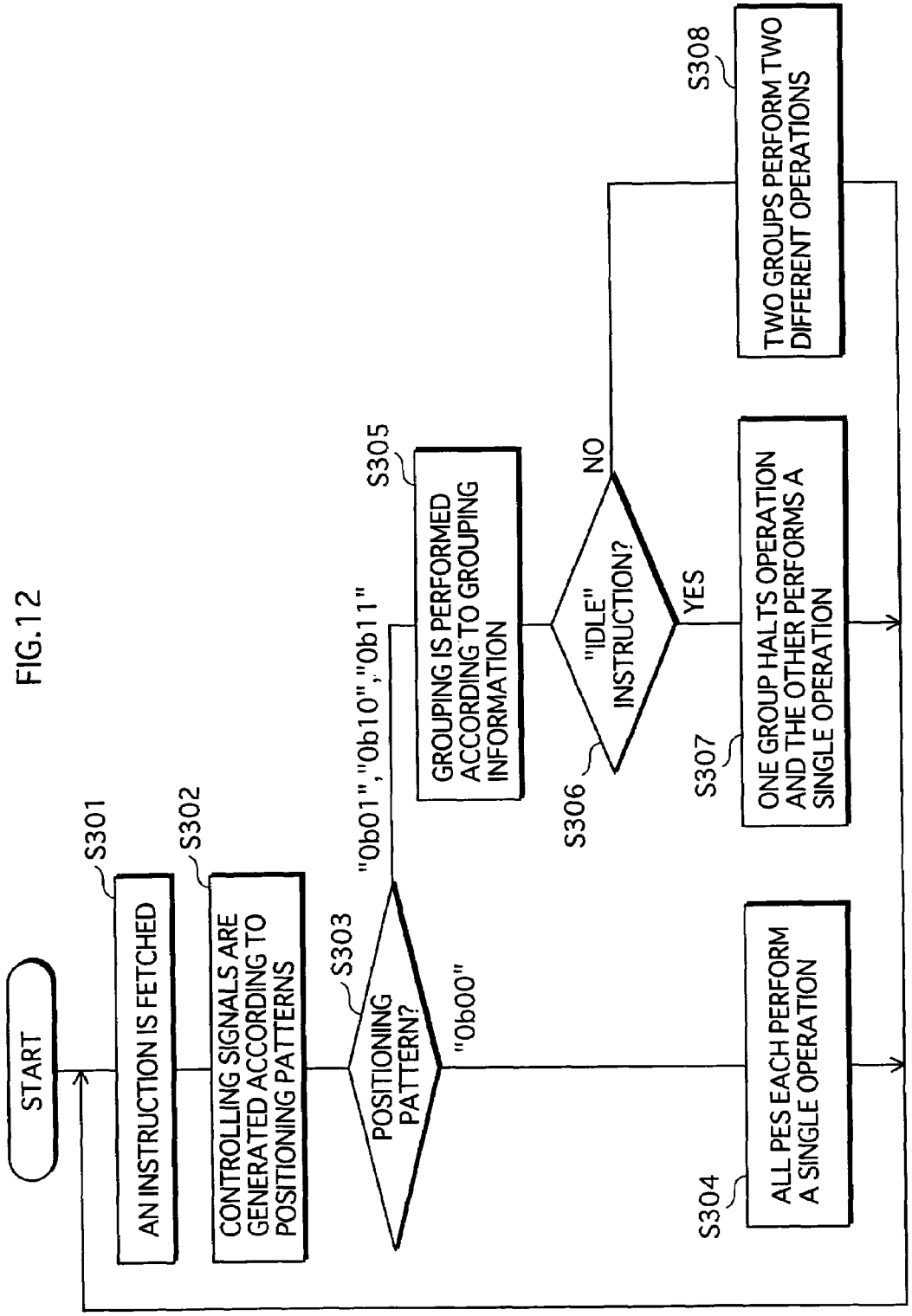
FIG. 12 shows the operational flow of the parallel execution processor 300 of the third embodiment of the present invention.

FIG. 12 shows the operational flow of the parallel execution processor 300 of the third embodiment.

Step S301: The instruction fetching unit 110 fetches a piece of instruction data.

Step S302: The instruction decoding unit 120 generates controlling signals from the piece of instruction data fetched by the instruction fetching unit 110, according to the positioning patterns, "0b00", "0b01", "0b10" and "0b11".

Step S303: The instruction decoding unit 120 extracts the positioning pattern indicated in the format field of the piece of instruction data and selects one of the decoding subunits 122a, 122b, 122c, and 122d according to the indicated positioning pattern.

Step S304: When the positioning pattern is indicated as "0b00" in Step S103, the instruction decoding unit 120 extracts one instruction from the piece of instruction data, decodes it, and generates two controlling signals that are identical. The generated controlling signals will be individually outputted via the controlling signal outputting units 121a and 121b, respectively, in parallel. The PEs 130a, 130b, 130c, and 130d respectively execute one same operation in parallel according to the outputted controlling signals.

Step S305: When the positioning pattern is indicated as one of "0b01", "0b10", and "0b11" in Step S303, the grouping unit 350 obtains a piece of grouping information from the CPU 1, and forms the PEs 130a, 130b, 130c, and 130d into the first and second groups according to the piece of grouping information.

The instruction decoding unit 120 extracts two instructions from the piece of instruction data, decodes them, and generates two controlling signals. These two controlling signals will be individually outputted via the controlling signal outputting units 121a and 121b, respectively, in parallel.

Step S306: The first PE group and the second PE group, each receive the controlling signal and judge whether the controlling signal instructs "Idle" or not.

Step S307: When one of the first PE group and the second PE group has received an "Idle" instruction in Step S306 (S306: Yes), the PEs belonging to the group that has received the "Idle" instruction halt operation, and the PEs belonging to the other group that has not received the "Idle" instruction respectively execute one operation in parallel.

Step S308: When neither of the first PE group and the second PE group has received an "Idle" instruction in Step S306 (S306: No), the PEs in the first group and the PEs in the second group respectively execute two different operations in parallel.

As explained so far, the parallel execution processor 300 is able to determine, for each of the PEs, to which group the PE belongs, instead of selecting a grouping procedure from among predetermined options.

By making it possible to determine, for each of the PEs, to which group the PE belongs, it is possible to achieve a more attentive grouping process, and further possible to improve the utilization efficiency of a parallel execution processor.

It should be noted that, in the third embodiment, one bit is allocated to each controlling signal outputting unit for indicating grouping information; however, it is also possible to have an arrangement wherein bits are allocated in a different manner.

Fourth Embodiment

General Outline

The parallel execution processor of the second embodiment obtains a piece of grouping information indicating a grouping procedure from the CPU 1, when the PEs 130a, 130b, 130c, and 130d are to be formed into two groups. The parallel execution processor of the fourth embodiment obtains a piece of grouping information from inside a piece of instruction data.

The following explains in detail the parallel execution processor of the fourth embodiment.

Structure

Figure 13:
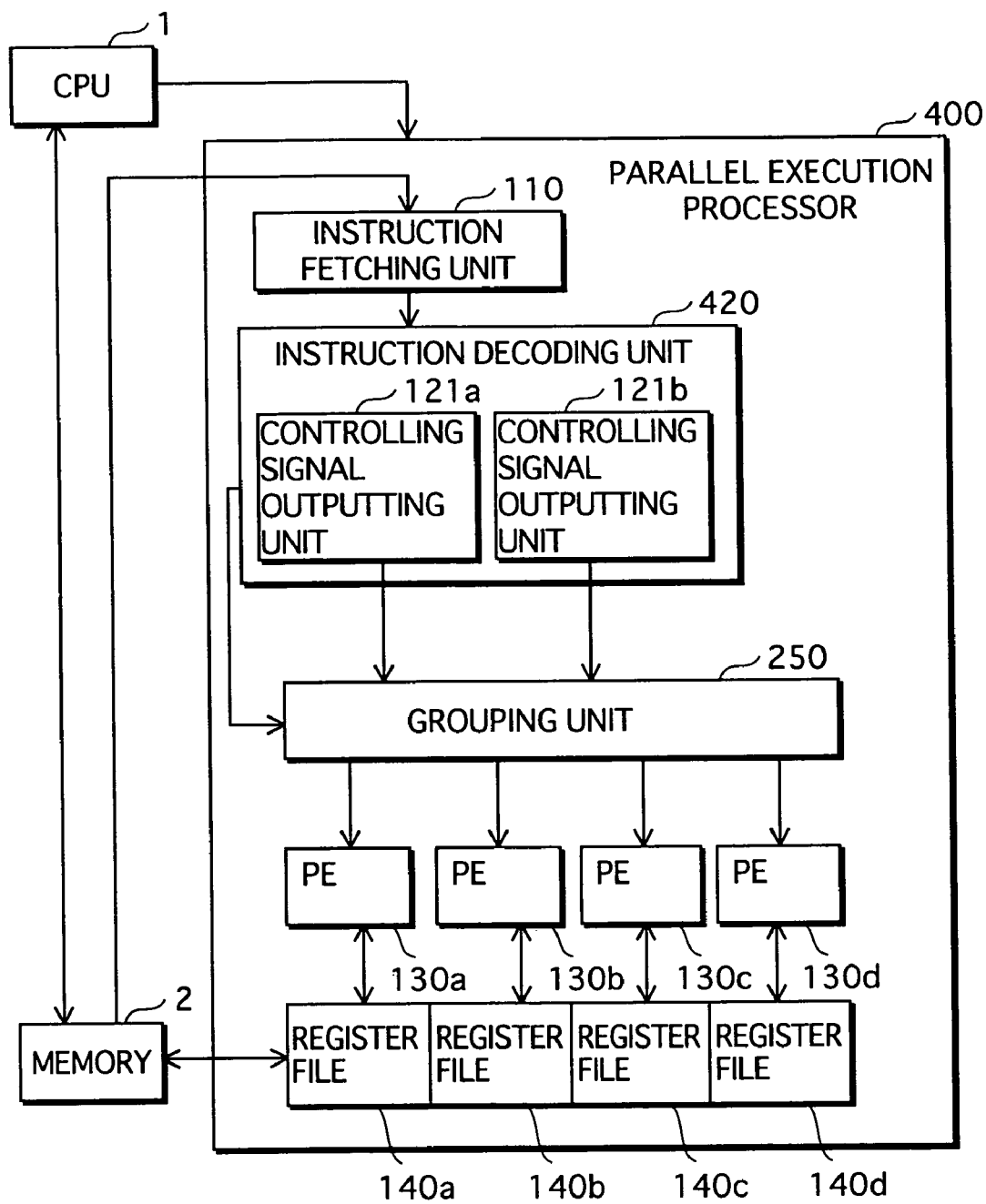
FIG. 13 shows the structure of a computer that includes the parallel execution processor of the fourth embodiment of the present invention.

FIG. 13 shows the structure of a computer that includes the parallel execution processor of the fourth embodiment.

As seen from the structure of the parallel execution processor 400 shown in FIG. 13, an instruction decoding unit 420 is provided instead of the instruction decoding unit 120 in the parallel execution processor 200 of the second embodiment. The components included also in the parallel execution processor 200 have the same reference characters as in FIG. 5, and explanation for those will be omitted.

In addition to the functions of the instruction decoding unit 120 in the second embodiment, the instruction decoding unit 420 also has a function of providing grouping information to the grouping unit 250. A piece of grouping information is included in a piece of instruction data that is fetched by the instruction fetching unit 110. The following explains the piece of instruction data according to the fourth embodiment.

FIGS. 14A to 14E show the data structures of pieces of instruction data in the fourth embodiment.

Figure 14A:
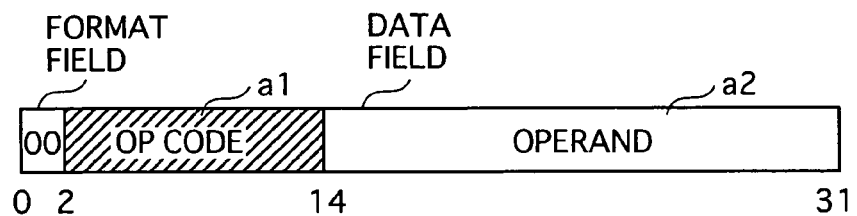
FIGS. 14A to 14E show the data structures of pieces of instruction data in the fourth embodiment.

FIG. 14A shows the data structure of a piece of instruction data in a case where the positioning pattern is "0b00".

This piece of instruction data has a data structure that is the same as the piece of instruction data shown in FIG. 2A and does not include grouping information. The reason for this is that when all of the PEs respectively execute one instruction, it is not necessary to concern about grouping the PEs.

Figure 14B:
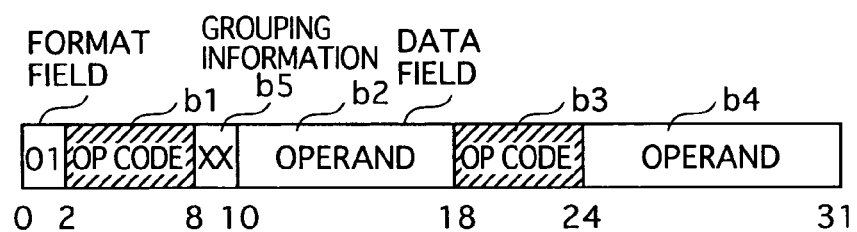

FIG. 14B shows the data structure of a piece of instruction data in a case where the positioning pattern is "0b01".

This piece of instruction data includes a piece of 2-bit grouping information, b5. As for the grouping information, one of "0b00" and "0b01" shown in FIG. 7 is specified. It should be noted that since two bits are allocated to the piece of grouping information b5, the operands b2 and b4 each have one less bit than those in FIG. 2B.

Figure 14C:
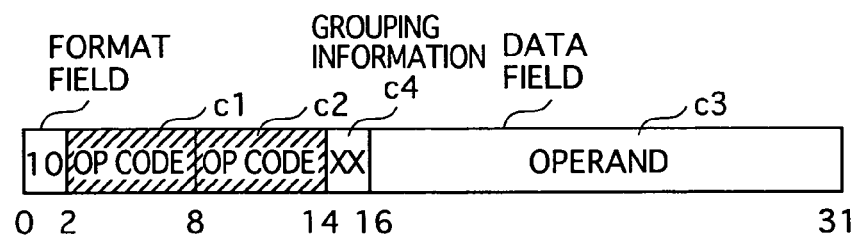

FIG. 14C shows the data structure of a piece of instruction data in a case where the positioning pattern is "0b10".

This piece of instruction data includes a piece of 2-bit grouping information, c4. As for the grouping information, one of "0b00" and "0b01" shown in FIG. 7 is specified. It should be noted that since two bits are allocated to the piece of grouping information c4, the operand c3 has two less bits than those in FIG. 2C.

Figure 14D:
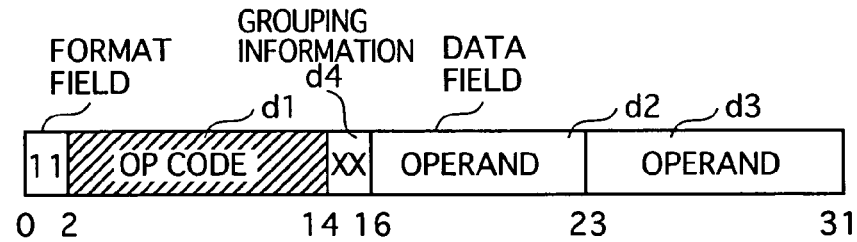
Figure 14E:
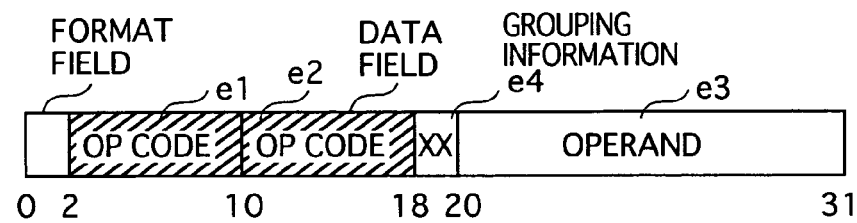

FIG. 14D shows the data structure of a piece of instruction data in a case where the positioning pattern is "0b11".

This piece of instruction data includes a piece of 2-bit grouping information, d4. As for the grouping information, one of "0b00" and "0b01" shown in FIG. 7 is specified. It should be noted that since two bits are allocated to the piece of grouping information d4, the operands d2 and d3 each have one less bit than those in FIG. 2D.

Figure 15:
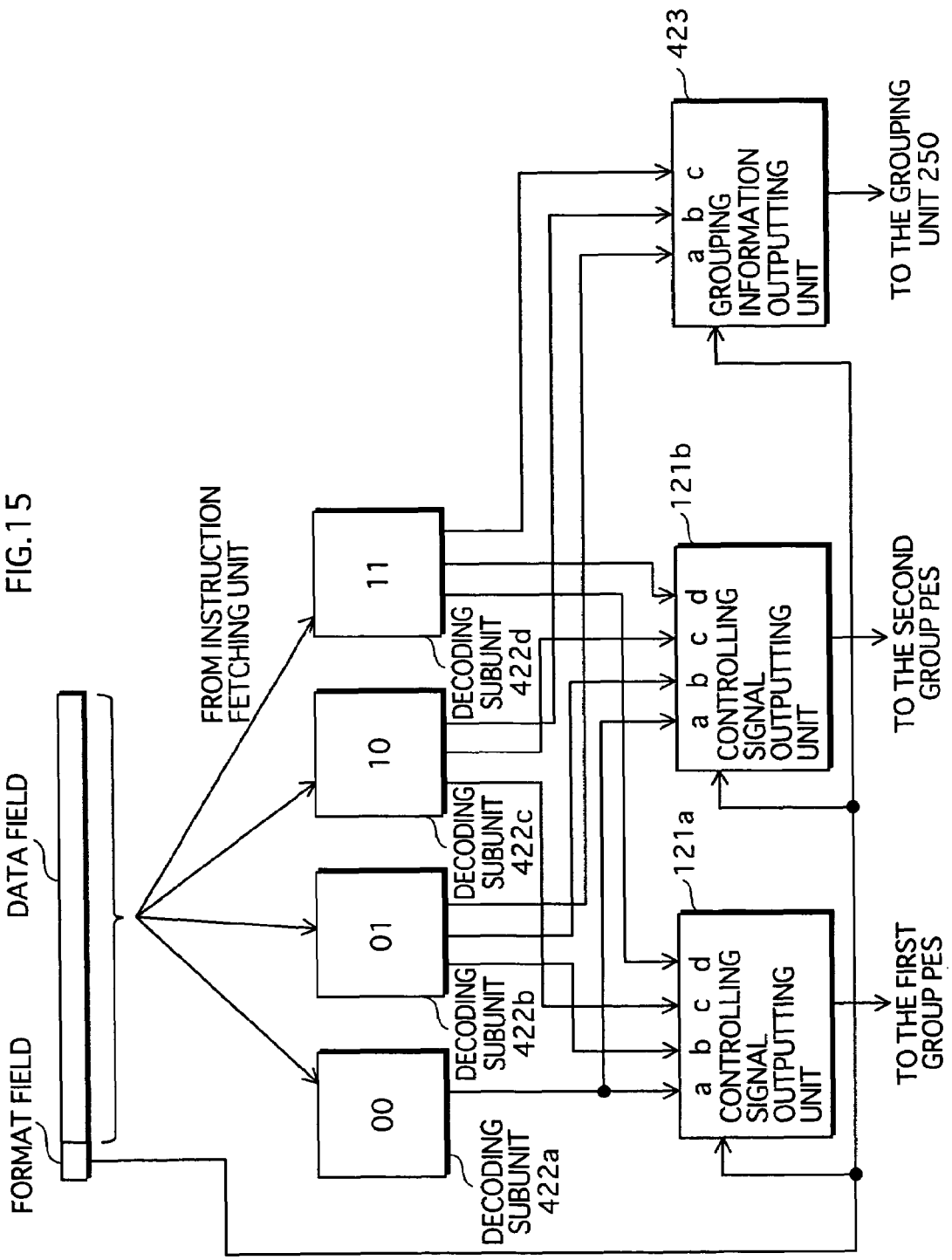
FIG. 15 shows the internal structure of the instruction decoding unit 420.

FIG. 15 shows the internal structure of the instruction decoding unit 420.

The instruction decoding unit 420 includes decoding sub-units 422a, 422b, 422c, and 422d, as well as controlling signal outputting units 121a and 121b, and a grouping information outputting unit 423.

As for a function of the instruction decoding unit 420 for outputting controlling signals, it is the same as that of the instruction decoding unit 120 in the second embodiment; therefore, explanation will be provided only on the function for providing the grouping unit 250 with grouping information.

The decoding subunit 422b, 422c, and 422d are used exclusively for the data structure shown in FIG. 14B, FIG. 14C, and FIG. 14D, respectively. The decoding subunits 422b, 422c, and 422d each extract a piece of grouping information from the data field so as to provide the piece of grouping information for the grouping information outputting unit 423.

The grouping information outputting unit 423 selectively outputs one of the pieces of grouping information inputted into the input terminals a, b, and c, according to the two bits in the format field. The piece of grouping information outputted will be provided for the grouping unit 250.

With this arrangement, the instruction decoding unit 420 is able to extract the piece of grouping information included in the piece of instruction data so as to output it to the grouping unit 250.

Operation

The following explains the operation performed by the parallel execution processor 400 with the aforementioned structure.

Figure 16:
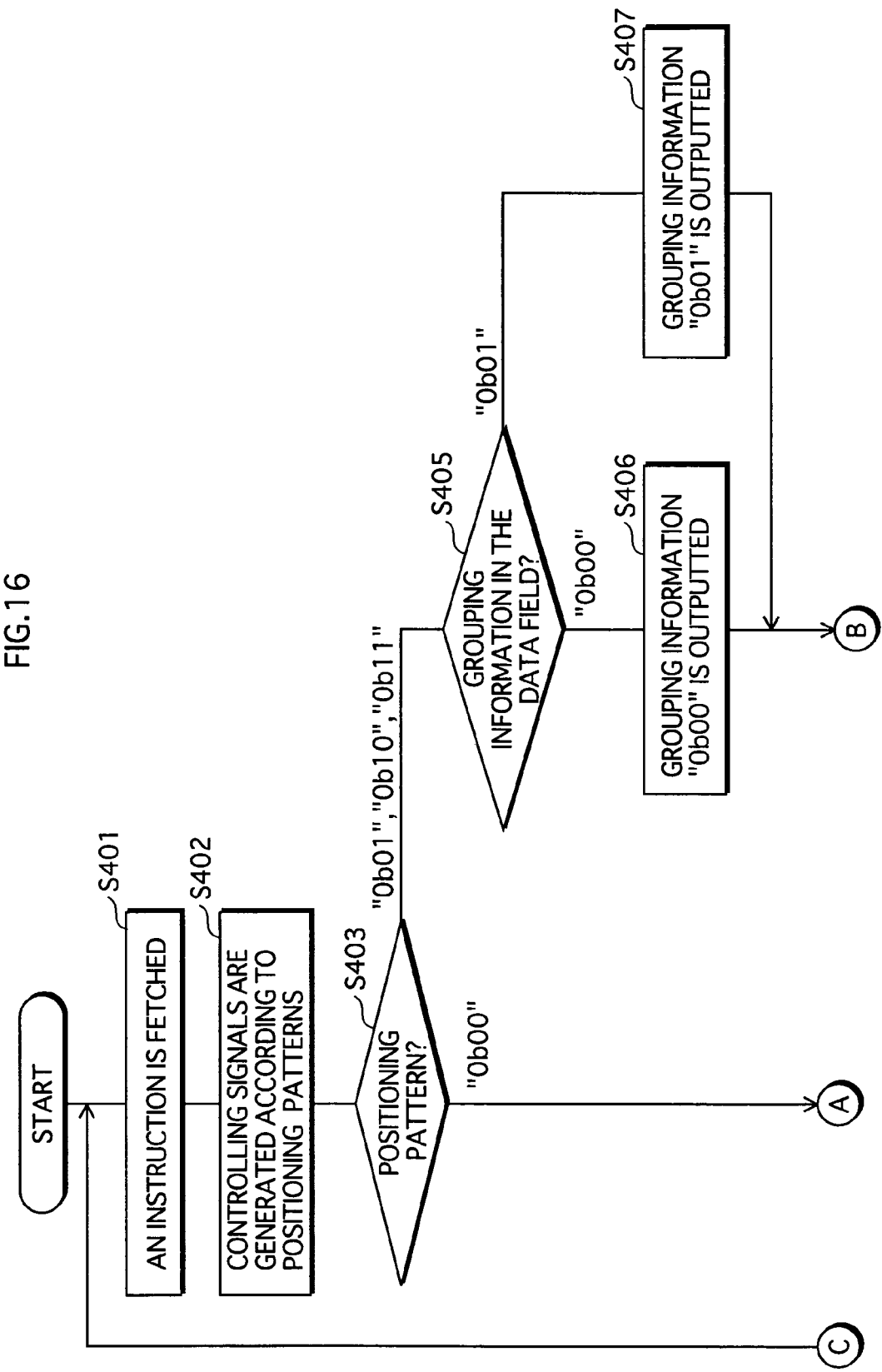
FIGS. 16 and 17 show the operational flow of the parallel execution processor 400 of the fourth embodiment of the present invention.
Figure 17:
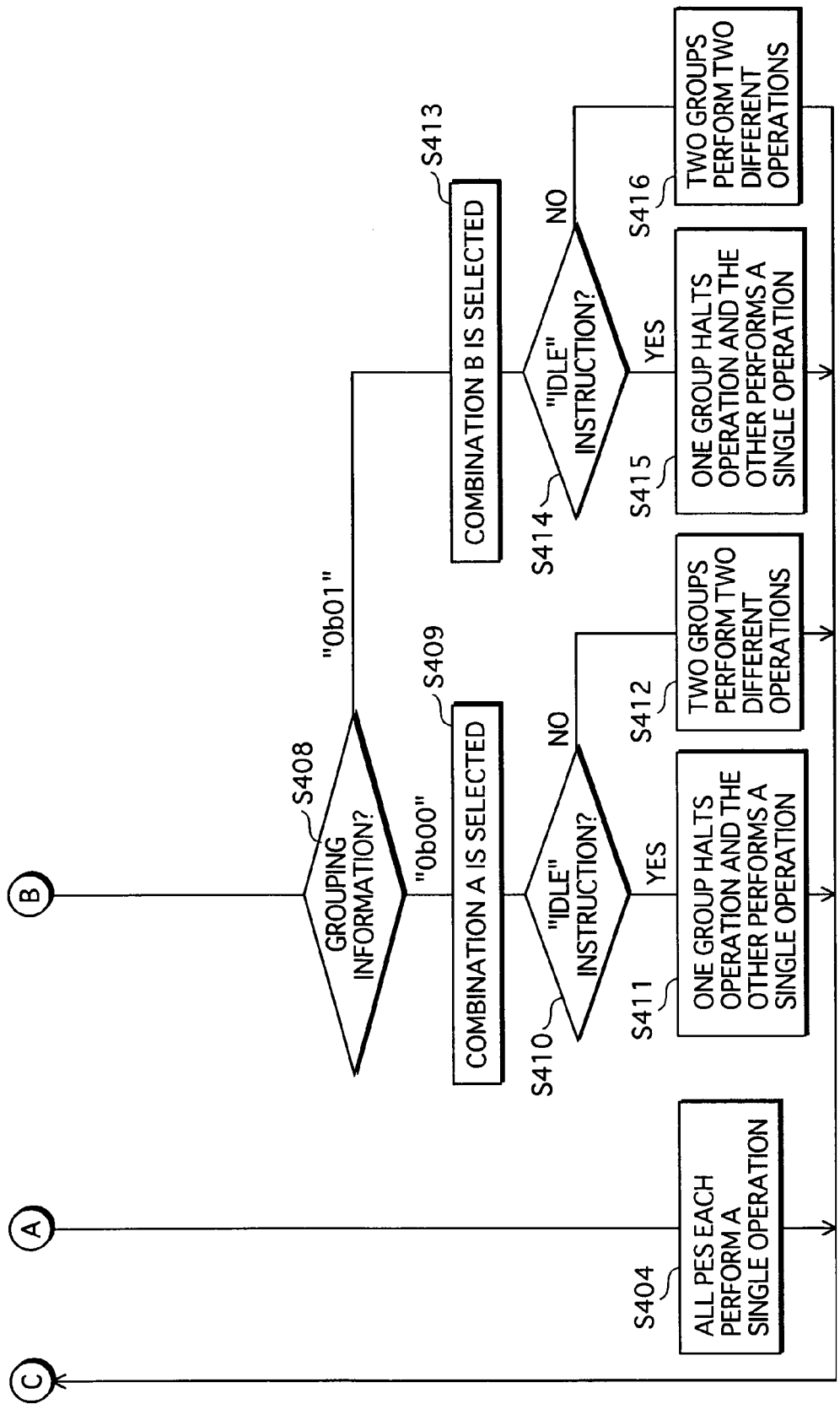

FIGS. 16 and 17 show the operational flow of the parallel execution processor 400 of the fourth embodiment.

Step S401: The instruction fetching unit 110 fetches a piece of instruction data.

Step S402: The instruction decoding unit 420 generates controlling signals from the piece of instruction data fetched by the instruction fetching unit 110, according to the positioning patterns, "0b00", "0b01", "0b10" and "0b11".

Step S403: The instruction decoding unit 420 extracts the positioning pattern indicated in the format field of the piece of instruction data and selects one of the decoding subunits 422a, 422b, 422c, and 422d according to the indicated positioning pattern.

Step S404: When the positioning pattern is indicated as "0b00" in Step S403, the instruction decoding unit 420 extracts one instruction from the piece of instruction data, decodes it, and generates two controlling signals that are identical. The generated controlling signals will be individually outputted via the controlling signal outputting units 121a and 121b, respectively, in parallel. The PEs 130a, 130b, 130c, and 130d respectively execute one same operation in parallel according to the outputted controlling signals.

Step S405: When the positioning pattern is indicated as one of "0b01", "0b10", and "0b11" in Step S403, the instruction decoding unit 420 extracts a piece of grouping information from the piece of instruction information.

Step S406: When the piece of grouping information is "0b00", the instruction decoding unit 420 outputs it to the grouping unit 250.

Step S407: When the piece of grouping information is "0b01", the instruction decoding unit 420 outputs it to the grouping unit 250.

Step S408: The grouping unit 250 obtains the piece of grouping information outputted from the instruction decoding unit 420.

Step S409: When the piece of grouping information obtained is "0b00", the grouping unit 250 selects Combination A.

The instruction decoding unit 420 extracts two instructions from the piece of instruction data, decodes them, and generates two controlling signals. These two controlling signals will be individually outputted via the controlling signal outputting units 121a and 121b, respectively, in parallel.

Step S410: The first PE group and the second PE group, that are of Combination A, each receive the controlling signal and judge whether the controlling signal instructs "Idle" or not.

Step S411: When one of the first PE group and the second PE group has received an "Idle" instruction in Step S410 (S410: Yes), the PEs belonging to the group that has received the "Idle" instruction halt operation, and the PEs belonging to the other group that has not received the "Idle" instruction respectively execute one operation in parallel.

Step S412: When neither of the first PE group and the second PE group has received an "Idle" instruction in Step S410 (S410: No), the PEs in the first group and the PEs in the second group respectively execute two different operations in parallel.

Step S413: When the piece of grouping information is "0b01", the grouping unit 250 selects Combination B.

The instruction decoding unit 420 extracts two instructions from the piece of instruction data, decodes them, and generates two controlling signals. These two controlling signals will be individually outputted via the controlling signal outputting units 121a and 121b, respectively, in parallel.

Step S414: The first PE group and the second PE group, that are of Combination B, each receive the controlling signal and judge whether the controlling signal instructs "Idle" or not.

Step S415: When one of the first PE group and the second PE group has received an "Idle" instruction in Step S414 (S414: Yes), the PEs belonging to the group that has received the "Idle" instruction halt operation, and the PEs belonging to the other group that has not received the "Idle" instruction respectively execute one operation in parallel.

Step S416: When neither of the first PE group and the second PE group has received an "Idle" instruction in Step S414 (S414: No), the PEs in the first group and the PEs in the second group respectively execute two different operations in parallel.

As explained so far, the parallel execution processor 400 is able to dynamically select a grouping procedure from among the predetermined options, when the PEs 130a, 130b, 130c, and 130d are to be formed into two groups.

With this arrangement, by making it possible to dynamically select a grouping procedure, it is possible to further improve the utilization efficiency of a parallel execution processor.

It should be noted that the structures of the pieces of instruction data explained above are mere examples, and it is acceptable to apply the present invention to other data structures. For example, when a piece of instruction data includes two OP codes and an operand, it is acceptable that the piece of instruction data has the structure shown in FIG. 14E, instead of the one shown in FIG. 14C. In the structure shown in FIG. 14E, a smaller number of bits are allocated to the operand, and a larger number of bits are allocated to the OP codes. As a result, compared to the case shown in FIG. 14C, the number of registers to be designated by the operand is reduced, but the number of types of instructions to be designated by the OP codes is increased.

Fifth Embodiment

In the parallel execution processor of the first embodiment, each of the PEs accesses its corresponding register file. In the parallel execution processor of the fifth embodiment, the register files are formed into a plurality of pairs, and each of the PEs is able to access either one of the register files in a pair.

With this arrangement, the parallel execution processor 500 is able to execute multiplication of pieces of complex number data without having to change the order in which pieces of real number data and pieces of imaginary number data are arranged.

The following describes in detail the parallel execution processor of the fifth embodiment.

Structure

Figure 18:
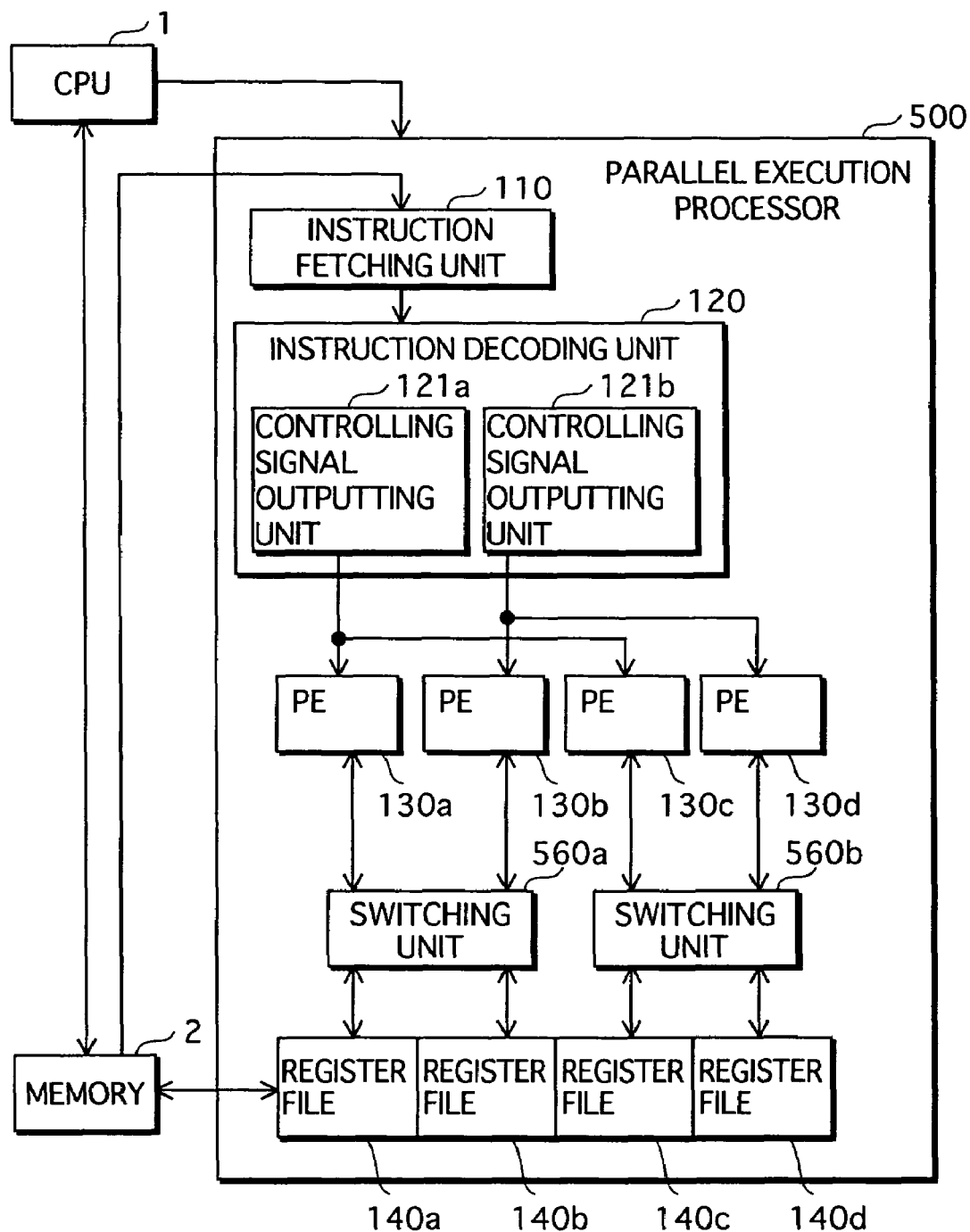
FIG. 18 shows the structure of a computer that includes the parallel execution processor 500 of the fifth embodiment.

FIG. 18 shows the structure of a computer that includes the parallel execution processor of the fifth embodiment.

As seen from the structure of the parallel execution processor 500 shown in FIG. 18, switching units 560a and 560b are added to the structure of the parallel execution processor 100 of the first embodiment. The components included also in the parallel execution processor 100 have the same reference characters as in FIG. 1, and explanation for those will be omitted.

The switching units 560a and 560b each switch the register files that a PE accesses. As a result, for example, the PE 130a is able to access, not only the register file 140a, but also the register file 140b. The PE 130b is able to access, not only the register file 140b, but also the register file 140a.

Figure 19:
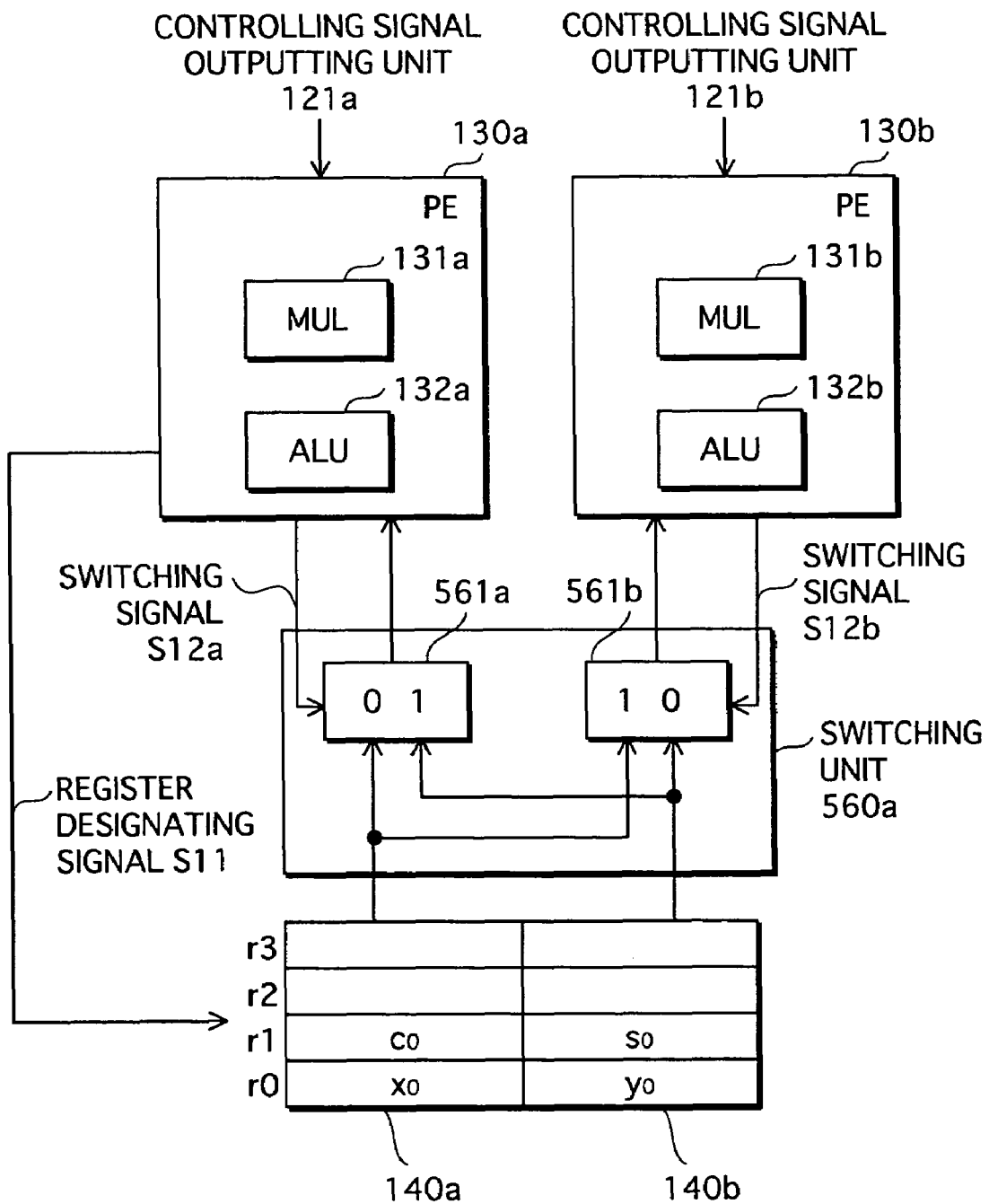

FIG. 19 shows the internal structures of the PE 130a, the PE 130b, and the switching unit 560a. It should be noted here that each of the register files 140a and 140b includes four registers, r0, r1, r2, and r3.

The PEs 130a and 130b each operate according to the controlling signals outputted via the controlling signal outputting units 121a and 121b. Each controlling signal controls functional units and data paths in each PE. Each of the PEs shown in FIG. 19 includes functional units such as a multiplier (MUL 131a or MUL 131b) and an arithmetic logic unit (ALU 132a or ALU 132b). The data paths are controlled by (i) designation of a register number to be accessed, (ii) designation of a register file to be accessed, (iii) designation of a functional unit into which a piece of data should be inputted, or the like. More specifically, the register designation signal S11 is used to designate a register number. Each of the switching signals S12a and S12b is used to designate a register file.

The switching unit 560a includes selectors 561a and 561b.

According to the switching signal S12a, the selector 561a switches from the register file 140a to the register file 140b, or from the register file 140b to the register file 140a, as a register file that the PE 130a accesses. More specifically, when the switching signal S12a indicates "0b0", the register file 140a will be selected, and when the switching signal S12a indicates "0b1", the register file 140b will be selected. Since the selector 561b operates in the same manner, explanation will be omitted.

With the aforementioned arrangement, the PEs 130a and 130b are each able to access either one of the register files 140a and 140b. For example, when the PE 130a needs to obtain the piece of data so stored in the register r1 in the register file 140b, the register designation signal S11 designates the register r1, and the switching signal S12a indicates "0b1". Consequently, the PE 130a is able to obtain the piece of data so.

During multimedia data processing, sometimes multiplication of pieces of complex number data is required frequently. The parallel execution processor 500 has an optimal specification for multiplying pieces of complex number data in parallel. The following is a detailed explanation.

FIGS. 20A to 20D show how pieces of complex number data are stored in the memory 2 and the register files 140a, 140b, 140c, and 140d.

Explanation will be provided on a case where operation will be performed on the following pieces of complex number data:

$$z_k = x_k + iy_k$$

$$w_k = c_k + is_k$$

The parallel execution processor 500 is able to execute, in two-way parallel, the multiplication of these pieces of complex number data, "$z_k^* w_k$". Here "i" is an imaginary unit, and "k" is an integer that is equal to or larger than zero. "$x_k$" and "$c_k$" are pieces of real number data, and "$y_k$" and "$s_k$" are pieces of imaginary number data.

FIG. 20A shows how pieces of data are stored in the memory 2.

Normally, the pieces of data stored in the memory 2 are arranged so that pieces of real number data and pieces of imaginary number data alternate. For example, $\{x_0, y_0, x_1, y_1\}$ are stored at the address "0x0100", and $\{c_0, s_0, c_1, s_1\}$ are stored at the address "0x0200".

FIG. 20B shows how pieces of data are stored in the register files 140a, 140b, 140c, and 140d after a load instruction is executed.

The parallel execution processor 500 fetches an instruction, and when the instruction is a load instruction, pieces of complex number data are loaded from the memory 2 to the register files 140a, 140b, 140c, and 140d. The load instruction designates the address of the memory 2 from which the pieces of complex number data are to be obtained. In this case, the addresses "0x0100" and "0x0200" are designated so that the pieces of data are obtained from there. The parallel execution processor 500 loads the pieces of complex number data without changing the order in which they are arranged.

The multiplication of the pieces of complex number data works as follows:

$$z_k^* w_k = (x_k^* c_k - y_k^* s_k) + i(x_k^* s_k + y_k^* c_k)$$

$$= X_k + iY_k$$

Here $X_k$ is a piece of real number data in the multiplication result, and $Y_k$ is a piece of imaginary number data in the multiplication result. The parallel execution processor 500 calculates $X_k$ with the PEs 130a and 130c and calculates $Y_k$ with the PEs 130b and 130d. The following describes the procedure more specifically.

The parallel execution processor 500 obtains $X_k$ and $Y_k$ in the following two steps:

Step 1: The PEs 130a and 130c perform the multiplication, $x_k^* c_k$. In parallel, the PEs 130b and 130d perform the multiplication, $x_k^* s_k$.

Step 2: The PEs 130a and 130c perform "multiply-subtract" (i.e. perform $y_k^* s_k$ and subtract the result from the result of Step 1). In parallel, the PEs 130b and 130d perform "multiply-accumulate" (i.e. perform $y_k^* c_k$ and add the result to the result of Step 1).

Accordingly, the PEs 130a and 130c obtain $X_k$, and the PEs 130b and 130d obtain $Y_k$.

FIG. 20C shows how pieces of data are stored in the register files 140a, 140b, 140c, and 140d after the multiplication instruction is executed in Step 1.

The piece of instruction data for the multiplication has the data structure shown in FIG. 2D. The OP code d1 is "MUL", the operand d2 is "r2(0), r0(0), r1(0)", and the operand d3 is "r2(0), r0(1), r1(0)".

The OP code "MUL" denotes a multiplication. The operand "r2(0), r0(0), r1(0)" denotes that the register r0 and the register r1 are source registers, and the register r2 is a destination register. The value in the parentheses attached to each register number is a value of the switching signal S12a or S12b.

The PEs 130a and 130c each receive a controlling signal generated from the OP codes d1 and d2, and each operate according to the controlling signal. At this time, the PEs 130a and 130c each output the register designation signals S11 according to the register numbers, and each output the switching signals S12a according to the values in the parentheses attached to the register numbers.

The PEs 130b and 130d each receive a controlling signal generated from the OP codes d1 and d3, and each operate according to the controlling signal. At this time, the PEs 130b and 130d each output the register designation signals S11 according to the register numbers, and each output the switching signals S12b according to the values in the parentheses attached to the register numbers.

Consequently, the results of $x_k^* c_k$ are stored in the register r2 of the register file 140a and the register r2 of the register file 140c. The results of $x_k^* s_k$ are stored in the register r2 of the register file 140b and the register r2 of the register file 140d.

FIG. 20D shows how pieces of data are stored in the register files 140a, 140b, 140c, and 140d after the multiply-subtract instruction and the multiply-accumulate instruction are executed in Step 2.

The piece of instruction data for a "multiply-subtract" instruction and a "multiply-accumulate" instruction has the data structure shown in FIG. 2B. The OP code b1 is "MSU", the operand b2 is "r2(0), r0(1), r1(1)", the OP code b3 is "MAC", and the operand b4 is "r2(0), r0(0), r1(1)".

The OP code "MSU" denotes "multiply-subtract". The OP codes "MAC" denotes "multiply-accumulate".

The PEs 130a and 130c each receive a controlling signal generated from the OP codes b1 and b2, and each operate according to the controlling signal. At this time, the PEs 130a and 130c each output the register designation signals S11 according to the register numbers, and each output the switching signals S12a according to the values in the parentheses attached to the register numbers.

The PEs 130b and 130d each receive a controlling signal generated from the OP codes b3 and b4, and each operate according to the controlling signals. At this time, the PEs 130b and 130d each output the register designation signals S11 according to the register numbers, and each output the switching signals S12b according to the values in the parentheses attached to the register numbers.

Consequently, the results $X_k$ which are the results of $(x_k*c_k-y_k*s_k)$ are stored in the register r2 of the register file 140a and the register r2 of the register file 140c. The results $Y_k$ which are the results of $(x_k*s_k+y_k*c_k)$ are stored in the register r2 of the register file 140b and the register r2 of the register file 140d.

Figure 21A:
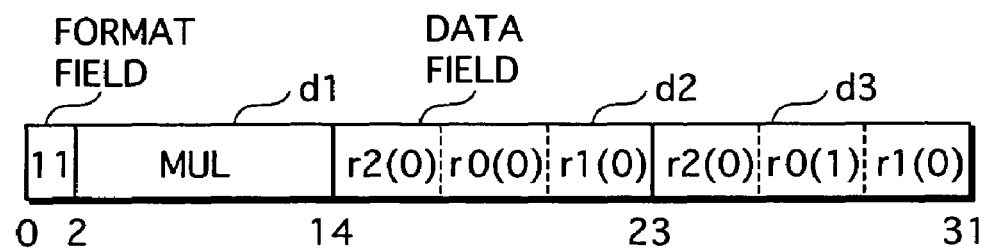
FIGS. 21A and 21B show the data structures of a piece of instruction data for a complex number multiplication instruction and a piece of instruction data for a "multiply-subtract" instruction and a "multiply-accumulate" instruction.
Figure 21B:
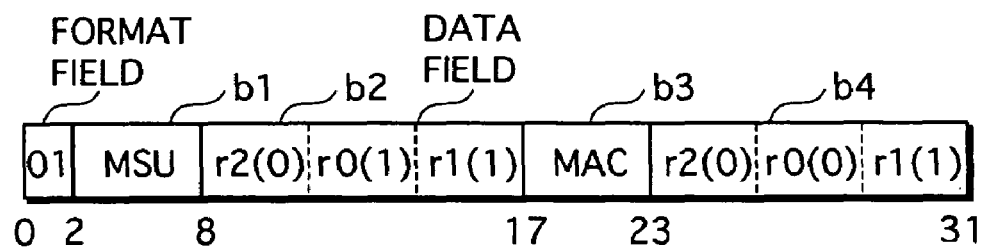

FIGS. 21A and 21B show the structures of a piece of multiplication instruction data and a piece of "multiply-subtract" and "multiply-accumulate" instruction data.

FIG. 21A is a piece of instruction data for a multiplication instruction.

As explained above, the piece of instruction data for a multiplication instruction has the data structure shown in FIG. 2D. The OP code d1 is "MUL", the operand d2 is "r2(0), r0(0), r1(0)", and the operand d3 is "r2(0), r0(1), r1(0)".

FIG. 21B is a piece of instruction data for a "multiply-subtract" instruction and a "multiply-accumulate" instruction.

As explained above, the piece of instruction data for a "multiply-subtract" instruction and a "multiply-accumulate" instruction has the data structure shown in FIG. 2B. The OP code b1 is "MSU", the operand b2 is "r2(0), r0(1), r1(1)", the OP code b3 is "MAC", and the operand b4 is "r2(0), r0(0), r1(1)".

In the parallel execution processor 500, the register files are formed into a plurality of pairs, and each of the PEs is able to access either one of the register files in a pair.

With this arrangement, the parallel execution processor 500 is able to execute multiplication of pieces of complex number data without having to change the order in which the pieces of real number data and the pieces of imaginary number data are arranged.

The aforementioned example with pieces of complex number data is a mere example of a case where the parallel execution processor 500 executes two different instructions in parallel. Accordingly, when one instruction has been fetched, the parallel execution processor has all the PEs respectively execute the one instruction in parallel. For example, when an addition instruction of pieces of complex number data has been fetched, the parallel execution processor has all the PEs respectively execute the addition instruction.

It should be noted that it is also acceptable to have an arrangement wherein the PEs 130a and 130c always handle real number data, and the PEs 130b and 130d always handle imaginary number data. With this arrangement, PE130a and 130c need to have circuits only for real number data, and PE 130b and 130d need to have circuits only for imaginary number data. As a result, it is possible to reduce the scale of the circuits in each PE.

In the fifth embodiment, each PE is able to access two register files because of the switching units 560a and 560b; however, the present invention is not limited to this arrangement. For example, it is also acceptable to have an arrangement where each PE is able to access all the register files. It is also acceptable to have an arrangement wherein, like in the second embodiment or the third embodiment, a grouping unit is provided so that it is possible to change, for each of the PE, the group to which the PE belongs.

The switching units 560a and 560b are controlled by the PEs, but the present invention is not limited to this arrangement. The following example is also acceptable:

When a PE designates the registers r0 and r2, the PE always accesses its own corresponding register file. When a PE designates the registers r1 and r3, the PE always accesses one of the other register files. In other words, it is acceptable to have an arrangement wherein the register file to be accessed changes according to the register numbers.

In all the embodiments above, the parallel execution processor includes four PEs, namely the PEs, 130a, 130b, 130c, and 130d; however, it should be noted that it is also acceptable that the parallel execution processor includes a larger number of PEs or a smaller number of PEs.

In the parallel execution processor, the PEs 130a, 130b, 130c, and 130d are formed into two groups; however, it is also acceptable if they are formed into a larger number of groups or a smaller number of groups. For example, it is also acceptable if each of all the PEs belongs to a different group.

In addition, it is not necessary to arrange it so that all the groups contain an equal number of PEs. For example, it is acceptable if the first group contains one PE, and the second group contains three PEs.

Additionally, in all the embodiments above, it is arranged so that the parallel execution processor rearranges the group formation depending on whether one instruction is processed or two instructions are processed; however, the invention is not limited to this arrangement. For example, if the second objection of the present invention i.e. "no need to change the order in which the pieces of data are arranged" is focused, it is acceptable to have an arrangement wherein the parallel execution processor always has the same group formation of the PEs 130a, 130b, 130c, and 130d, and a certain number of instructions are fetched. This arrangement is effective particularly for a case where pieces of data to be processed according to different instructions are arranged in the memory 2 according to a predetermined rule. For example, when pieces of complex number data are to be processed, the parallel execution processor always forms the PEs 130a, 130b, 130c, and 130d into two groups, and an instruction for processing pieces of real number data and an instruction for processing pieces of imaginary number data will be fetched. Consequently, the parallel execution processor will be able to execute, in parallel, instructions that are different from each other, without having to change the order in which the pieces of data are arranged.

Further, in all the embodiments above, the positioning pattern is indicated in the format field of a piece of instruction data; however, the present invention is not limited to this arrangement. The following example is also acceptable:

FIGS. 22A, 22B, 22C, 22D show the data structures of pieces of instruction data.

The pieces of instruction data shown in FIGS. 22A to 22D each do not have a format field. Those bits that could be used for a format field are actually allocated to OP codes and operands instead.

Figure 23:
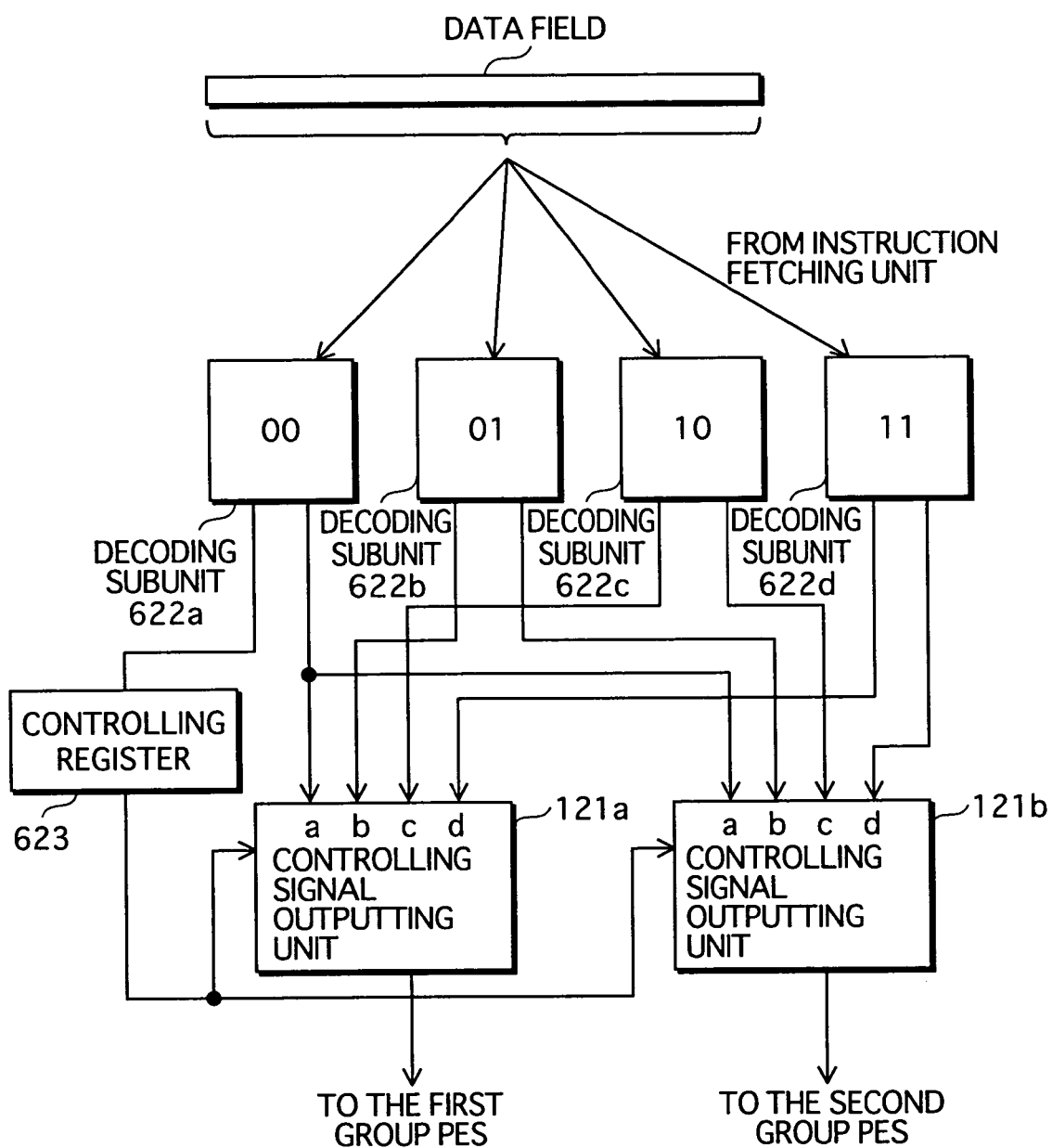
FIG. 23 shows the internal structure of the instruction decoding unit.

FIG. 23 shows the internal structure of an instruction decoding unit.

The instruction decoding unit includes: decoding subunits 622a, 622b, 622c, and 622; controlling signal outputting units 121a and 122b; and a controlling register 623.

Figure 22A:
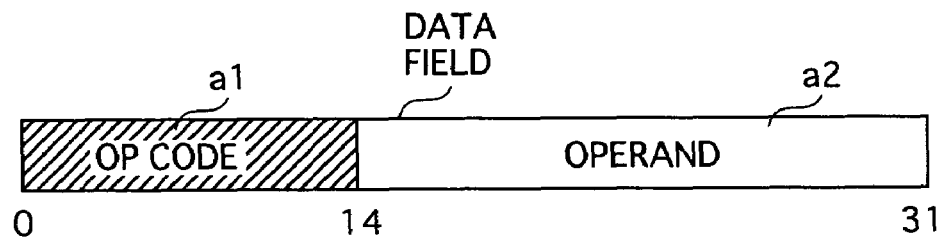
FIGS. 22A to 22D show the data structures of pieces of instruction data.

The decoding subunit 622a is used exclusively for the data structure shown in FIG. 22A. The decoding subunit 622a decodes the first 14 bits in the data field as an OP code and the following 18 bits as an operand so as to generate two controlling signals that are identical.

The generated controlling signals will be individually provided for the controlling signal outputting units 121*a* and 121*b*, respectively.

Figure 22B:
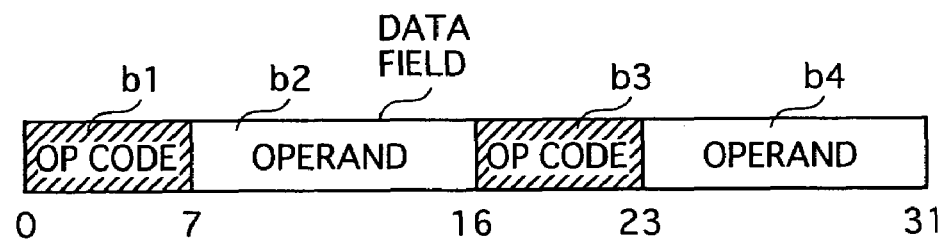

The decoding subunit 622*b* is used exclusively for the data structure shown in FIG. 22B. The decoding subunit 622*b* decodes the first 7 bits in the data field as an OP code and the following 9 bits as an operand, the following 7 bits an another OP code, and the following 9 bits as another operand, so as to generate two controlling signals.

The controlling signal generated from the OP code b1 and the operand b2 will be provided for the controlling signal outputting unit 121*a*. The controlling signal generated from the OP code b3 and the operand b4 will be provided for the controlling signal outputting unit 121*b*.

Figure 22C:
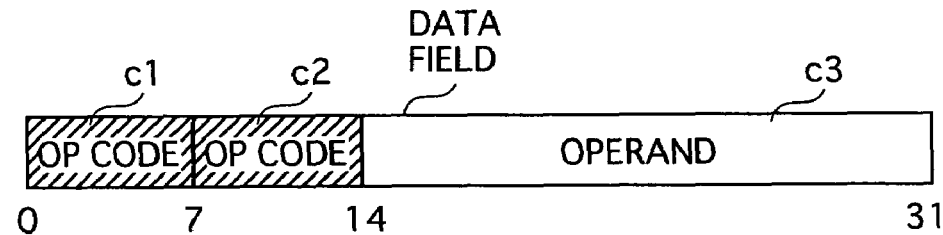

The decoding subunit 622*c* is used exclusively for the data structure shown in FIG. 22C. The decoding subunit 622*c* decodes the first 7 bits in the data field as an OP code, the following 7 bits as another OP code, and the following 18 bits as an operand, so as to generate two controlling signals.

The controlling signal generated from the OP code c1 and the operand c3 will be provided for the controlling signal outputting unit 121*a*. The controlling signal generated from the OP code c2 and the operand c3 will be provided for the controlling signal outputting unit 121*b*.

Figure 22D:
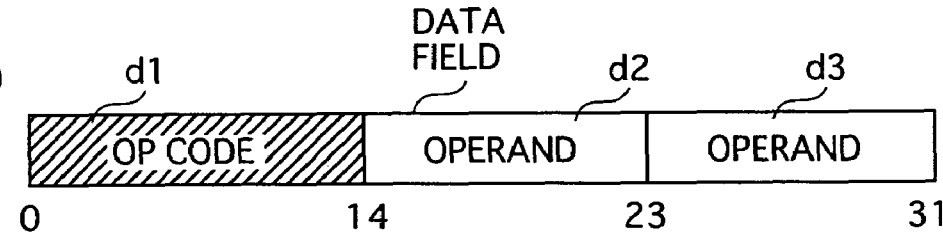

The decoding subunit 622*d* is used exclusively for the data structure shown in FIG. 22D. The decoding subunit 622*d* decodes the first 14 bits in the data field as an OP code, the following 9 bits as an operand, and the following 9 bits as another operand, so as to generate two controlling signals.

The controlling signal generated from the OP code d1 and the operand d2 will be provided for the controlling signal outputting unit 121*a*. The controlling signal generated from the OP code d1 and the operand d3 will be provided for the controlling signal outputting unit 121*b*.

The controlling register 623 stores therein positioning patterns that are the same as the ones written in the format fields shown in FIGS. 2A to 2E. A positioning pattern is specified when a controlling register specification instruction is executed. A controlling-register specification instruction has the data structure shown in FIG. 22A. When the decoding subunit 622*a* decodes a controlling register specification instruction, a positioning pattern is specified.

Each of the controlling signal outputting units 121*a* and 121*b* selectively outputs one of the controlling signals inputted into the input terminals a, b, c, and d, according to the two bits indicating a positioning pattern in the controlling register 623.

As explained so far, when a piece of instruction data does not have a format field, those bits that could be used for a format field are actually allocated to OP codes and operands instead. This way, when a controlling register is used, it is possible to increase the number of types of instructions or the number of registers that can be designated by a piece of instruction data, compared to when format fields are used.

As for the case where a controlling register is used, however, when what is stored in the controlling register 623 needs to be changed, a controlling register specification information is required; therefore, it is desirable to choose whether format fields are used or a controlling register is used depending on the frequency of having to change the group formation pattern.

It is also acceptable to have both of the arrangements together, where format fields are used and where the controlling register is used.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A parallel execution processor comprising:
a plurality of processing elements;
an obtaining unit operable to obtain an instruction sequence including one or more instructions;
a decoding unit operable to decode the obtained instruction sequence into the one or more instructions;
a group forming unit operable to form the processing elements into as many groups as the number of instructions included in the instruction sequence;
a plurality of register files, each of which corresponds to a different one of the processing elements; and
an execution controlling unit operable to assign the one or more instructions decoded by the decoding unit to the groups of the processing elements, so that each group of the processing elements receives a different one of the one or more instructions, and control the processing elements so that (i) the instructions received by the groups of the processing elements are executed in parallel, (ii) in each group, all processing elements in the group each execute the same instruction received by the group, and (iii) each processing element receives data from a different register file.

2. The parallel execution processor of claim 1, wherein
when the number of instructions included in the instruction sequence is one, the group forming unit forms all of the processing elements into one group, and
when the number of instructions included in the instruction sequence is two, the group forming unit forms all of the processing elements into two groups so that the two groups contain an equal number of processing elements.

3. The parallel execution processor of claim 2, wherein
the instruction sequence includes a first instruction and a second instruction,
the register files are arranged in the register so that first-group register files and second-group register files alternate, (i) the first-group register files each storing therein a piece of data to be processed when the first instruction is executed and (ii) the second-group register files each storing therein a piece of data to be processed when the second instruction is executed,
when the number of instructions included in the instruction sequence is two, the group forming unit forms the processing elements corresponding to the first-group register files into one of the two groups, and the processing elements corresponding to the second-group register files into the other group, and
each of the processing elements obtains the piece of data to be processed from the corresponding register file.

4. The parallel execution processor of claim 3, wherein
the register files are formed into a plurality of pairs, keeping an order in which the register files are arranged,
each of the instructions includes a piece of selection information indicating which piece of data each processing element should obtain, selecting out of (a) the piece of data stored in the corresponding register file and (b) the piece of data stored in a register file with which the corresponding register file is paired, and
each of the processing elements obtains the piece of data to be processed from the register file indicated in each piece of selection information.

5. The parallel execution processor of claim 2, wherein when the number of instructions included in the instruction sequence is two, the execution controlling unit includes:

a storing unit that stores therein a plurality of combination options based on which of the processing elements should belong to each of the two groups, the combination options being prepared for each of a plurality of grouping procedures;

a grouping information obtaining unit operable to obtain a piece of grouping information indicating which one of the grouping procedures should be used; and a selecting unit operable to select one of the combination options according to the obtained piece of grouping information.

6. The parallel execution processor of claim 2, wherein when the number of instructions included in the instruction sequence is two, the execution controlling unit includes:

a grouping information obtaining unit operable to obtain a piece of grouping information indicating to which one of the two groups each of the processing elements should belong; and a grouping unit operable to form the processing elements into the two groups according to the obtained piece of grouping information.

7. The parallel execution processor of claim 1, further comprising a fetching unit operable to fetch a piece of data which is of a predetermined length and has a format field and a data field, wherein each of the instructions includes an OP code and an operand, a positioning pattern is written in the format field, the positioning pattern being for positioning OP codes and operands in the data field, in the piece of data, one or more OP codes and one or more operands are arranged in the data field in an order defined by the positioning pattern written in the format field, the obtaining unit obtains, as the instruction sequence, the piece of data of the predetermined length fetched by the fetching unit, the decoding unit extracts, from the piece of data, the one or more OP codes and the one or more operands, according to the positioning pattern so as to decode the OP codes and the operands of the instructions, and the execution controlling unit assigns, in the defined order, the decoded instructions to the groups.

8. The parallel execution processor of claim 1, further comprising:

a fetching unit operable to fetch a piece of data which is of a predetermined length; and a storing unit operable to store therein a predetermined positioning pattern for OP codes and operands, wherein each of the instructions includes an OP code and an operand, one or more OP codes and one or more operands are arranged in the piece of data in an order defined by the predetermined positioning pattern, the obtaining unit obtains, as the instruction sequence, the piece of data of the predetermined length fetched by the fetching unit the decoding unit extracts, from the piece of data, the one or more OP codes and the one or more operands, according to the positioning pattern stored in the storing unit so as to decode the OP codes and the operands of the instructions, and the execution controlling unit assigns, in the defined order, the decoded instructions to the groups.

9. The parallel execution processor of claim 1, wherein when the instruction sequence obtained by the obtaining unit includes two or more instructions and one of the instructions instructs that processing elements included in some of the groups should halt operation, the execution controlling unit controls the processing elements included in those groups so that those processing elements halt operation.

10. An instruction assigning method for assigning instructions to a plurality of processing elements for executing in parallel one instruction to be assigned to one group of the processing elements, comprising:

an obtaining step of obtaining an instruction sequence including one or more instructions;

a decoding step of decoding the obtained instruction sequence into the one or more instructions;

a group forming step of forming the processing elements into as many groups as the number of instructions included in the instruction sequence; and an execution controlling step of assigning the one or more instructions decoded in the decoding step to the groups of the processing elements, so that each group of the processing elements receives a different one of the one or more instructions, and controlling the processing elements so that (i) the instructions received by the groups of the processing elements are executed in parallel, (ii) in each group, all processing elements in the group each execute in parallel the same instruction received by the group, and (iii) each processing element receives data from a different register file.

11. A parallel execution processor system for processing a plurality of instruction sequences comprising:

a plurality of processing elements;

an obtaining unit for obtaining an instruction sequence including one or more instructions, wherein the number of processing elements is greater than the number of instructions;

a decoding unit for decoding the obtained instruction sequence into the one or more instructions;

a group forming unit for forming the processing elements into as many groups as the number of instructions included in the instruction sequence;

a plurality of register files, each of which corresponds to a different one of the processing elements; and an execution controlling unit for assigning the one or more instructions decoded by the decoding unit to the groups of the processing elements, so that each group of the processing elements receives a different one of the one or more instructions, and control the processing elements so that (i) the instructions received by the groups of the processing elements are executed in parallel, (ii) in each group, all processing elements in the group each execute in parallel the same instruction received by the group, and (iii) each processing element receives data from a different register file.

12. The parallel execution processor system of claim 11 further comprising at least two processing elements and wherein the obtaining unit obtains an instruction sequence including only one instruction.

13. The parallel execution processor system of claim 11 further including a source of a plurality of instructions.

14. The parallel execution processor system of claim 13 further comprising at least four processing elements and wherein the obtaining unit obtains an instruction sequence including a maximum of two instructions.

15. The parallel execution processor system of claim 13 further comprising at least 64 processing elements and wherein the obtaining unit obtains an instruction sequence including a maximum of 32 instructions.

16. The parallel execution processor system of claim 13 further comprising at least 128 processing elements and wherein the obtaining unit obtains an instruction sequence including a maximum of 64 instructions.

* * * * *